US012684649B2

(12) United States Patent
Wang et al.

(10) Patent No.: US 12,684,649 B2
(45) Date of Patent: Jul. 14, 2026

(54) METHODS AND APPARATUSES FOR CONTROL OF PACKET DATA CONNECTION

(71) Applicant: Telefonaktiebolaget LM Ericsson (publ), Stockholm (SE)

(72) Inventors: Yan Wang, Shanghai (CN); Dong Chen, Shanghai (CN); Lifan Qu, Shanghai (CN); Songyu Wang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 573 days.

(21) Appl. No.: 18/017,584

(22) PCT Filed: Jun. 17, 2021

(86) PCT No.: PCT/EP2021/066459
§ 371 (c)(1),
(2) Date: Jan. 23, 2023

(87) PCT Pub. No.: WO2022/017695
PCT Pub. Date: Jan. 27, 2022

(65) Prior Publication Data
US 2023/0300943 A1 Sep. 21, 2023

(30) Foreign Application Priority Data

Jul. 24, 2020 (WO) ................ PCT/CN2020/104597

(51) Int. Cl.
*H04W 76/30* (2018.01)
*H04W 60/06* (2009.01)
(52) U.S. Cl.
CPC ........... *H04W 76/30* (2018.02); *H04W 60/06* (2013.01)

(58) Field of Classification Search
CPC ....... H04W 76/30; H04W 60/06; H04W 4/24; H04M 15/8038; H04M 15/66;
(Continued)

(56) References Cited

U.S. PATENT DOCUMENTS

2018/0199240 A1* 7/2018 Dao et al. ......... H04W 36/0016
2019/0158675 A1* 5/2019 Chong et al. ......... H04M 15/60
(Continued)

FOREIGN PATENT DOCUMENTS

CN 109429329 A 3/2019
CN 110199513 A 9/2019
(Continued)

OTHER PUBLICATIONS

3GPP TS 23.214 V15.3.0 (Jul. 2018) (Year: 2018).*
(Continued)

*Primary Examiner* — Rebecca E Song
*Assistant Examiner* — Gary A Miller
(74) *Attorney, Agent, or Firm* — Rothwell, Figg, Ernst & Manbeck, P.C.

(57) ABSTRACT

Methods and apparatuses for control of packet data connection are disclosed. According to an embodiment, a user plane entity receives, from a control plane entity, a request for modifying parameters related to a packet data connection at least part of which is to be deleted. Upon receipt of the request, the user plane entity stops forwarding and counting of packets in only one of downlink and uplink directions for the at least part of the packet data connection to be deleted.

6 Claims, 14 Drawing Sheets

Receive, from a control plane entity, a request for modifying parameters related to a packet data connection at least part of which is to be deleted ⟍ 402

Upon receipt of the request, stop forwarding and counting of packets in only one of downlink and uplink directions for the at least part of the packet data connection to be deleted ⟍ 404

(58) Field of Classification Search

CPC .......... H04M 15/8214; H04M 15/8228; H04L 12/14; H04L 12/1403; H04L 12/1435

See application file for complete search history.

(56) References Cited

U.S. PATENT DOCUMENTS

| | | | | |
|---|---|---|---|---|
| 2020/0128609 | A1 | 4/2020 | Wei et al. | |
| 2020/0260525 | A1* | 8/2020 | Gan et al. | ............. H04W 80/10 |
| 2021/0059003 | A1* | 2/2021 | Kim et al. | ............ H04W 76/27 |
| 2021/0298108 | A1* | 9/2021 | Wu et al. | .............. H04W 76/19 |
| 2022/0329530 | A1* | 10/2022 | Yang et al. | ......... H04L 47/2408 |
| 2022/0407743 | A1* | 12/2022 | Takano | ............... H04L 12/5601 |

FOREIGN PATENT DOCUMENTS

| | | | | |
|---|---|---|---|---|
| CN | 110431881 | A | 11/2019 | |
| CN | 111165014 | A | 5/2020 | |
| CN | 112105066 | A * | 12/2020 | ........ H04W 36/0033 |
| WO | 2018205131 | A1 | 11/2018 | |
| WO | 2018224126 | A | 12/2018 | |

OTHER PUBLICATIONS

International Search Report and Written Opinion issued in International Application No. PCT/EP2021/066459 dated Nov. 19, 2021 (15 pages).

Ericsson, "Support of event based reporting for charging", 3GPP TSG CT WG4 Meeting #86bis, C4-187509, Vilnius, Lithuania, Oct. 15-19, 2018 (26 pages).

Huawei et al., "Resolve Editor's Note on Pause of Charging (TS 23.502)", SA WG2 Meeting #124, S2-179558, Reno, USA Nov. 27-Dec. 1, 2017 (17 pages).

3GPP TS 23.502 V18.0.0 (Dec. 2022), 3rd Generation Partnership Project; Technical Specification Group Services and System Aspects; Procedures for the 5G System (5GS); Stage 2 (Release 18), Dec. 2022 (773 pages).

3GPP TS 23.501 V18.0.0 (Dec. 2022), 3rd Generation Partnership Project; Technical Specification Group Services and System Aspects; System architecture for the 5G System (5GS); Stage 2 (Release 18), Dec. 2022 (593 pages).

ETSI TS 123 060 V16.0.0 (Nov. 2020), Digital cellular telecommunications system (Phase 2+) (GSM); Universal Mobile Telecommunications System (UMTS); General Packet Radio Service (GPRS); Service description; Stage 2 (3GPP TS 23.060 version 16.0.0 Release 16), Nov. 2020 (373 pages).

3GPP TS 23.401 V16.6.0 (Mar. 2020), 3rd Generation Partnership Project; Technical Specification Group Services and System Aspects; General Packet Radio Service (GPRS) enhancements for Evolved Universal Terrestrial Radio Access Network (E-UTRAN) access (Release 16), Mar. 2020 (436 pages).

3GPP TS 23.214 V16.0.0 (Jun. 2019), 3rd Generation Partnership Project; Technical Specification Group Services and System Aspects; Architecture enhancements for control and user plane separation of EPC nodes; Stage 2, (Release 16), Jun. 2019 (92 pages).

ETSI TS 129 244 V16.4.0 (Nov. 2020), LTE; 5G; Interface between the Control Plane and the User Plane nodes, (3GPP TS 29.244 version 16.4.0 Release 16), Nov. 2020 (314 pages).

Ericsson, "TS23.401 Modify Bearer Request in TAU with SGW change and Data Forwarding," SA WG2 Meeting #124, Doc. No. S2-178355 (Nov. 2017) (8 pages).

Huawei, et. al., "TS23.502_Update of the Service Request procedure when the AMF has an old NAS connection," 3GPP SA WG2 Meeting #124, Tdoc S2-179531 (Nov.-Dec. 2017) (11 pages).

* cited by examiner

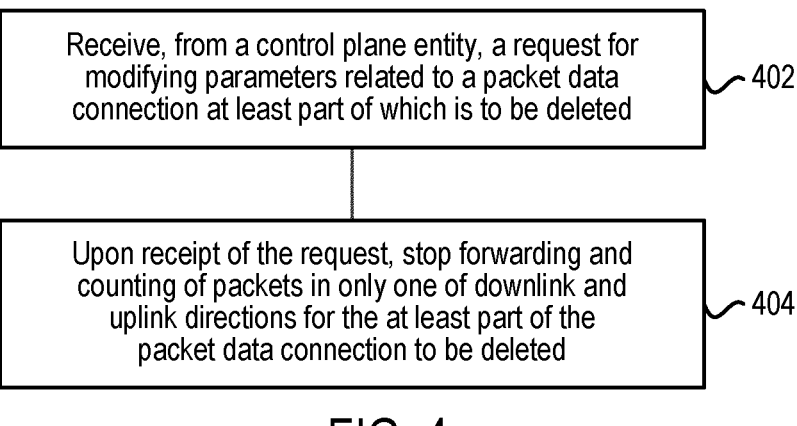

Receive, from a control plane entity, a request for modifying parameters related to a packet data connection at least part of which is to be deleted 402

Upon receipt of the request, stop forwarding and counting of packets in only one of downlink and uplink directions for the at least part of the packet data connection to be deleted 404

FIG. 4

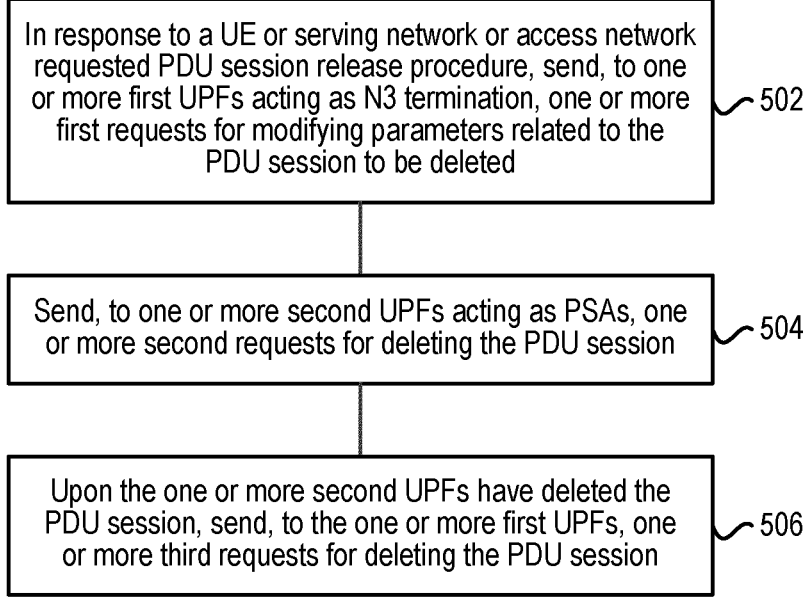

In response to a UE or serving network or access network requested PDU session release procedure, send, to one or more first UPFs acting as N3 termination, one or more first requests for modifying parameters related to the PDU session to be deleted 502

Send, to one or more second UPFs acting as PSAs, one or more second requests for deleting the PDU session 504

Upon the one or more second UPFs have deleted the PDU session, send, to the one or more first UPFs, one or more third requests for deleting the PDU session 506

FIG. 5A

In response to a PCF or the SMF requested PDU session release procedure, send, to one or more first UPFs acting as PSAs, one or more first requests for modifying parameters related to the PDU session to be deleted ⟋508

Send, to one or more second UPFs acting as N3 termination, one or more second requests for deleting the PDU session ⟋510

Upon the one or more second UPFs have deleted the PDU session, send, to the one or more first UPFs, one or more third requests for deleting the PDU session ⟋512

FIG. 5B

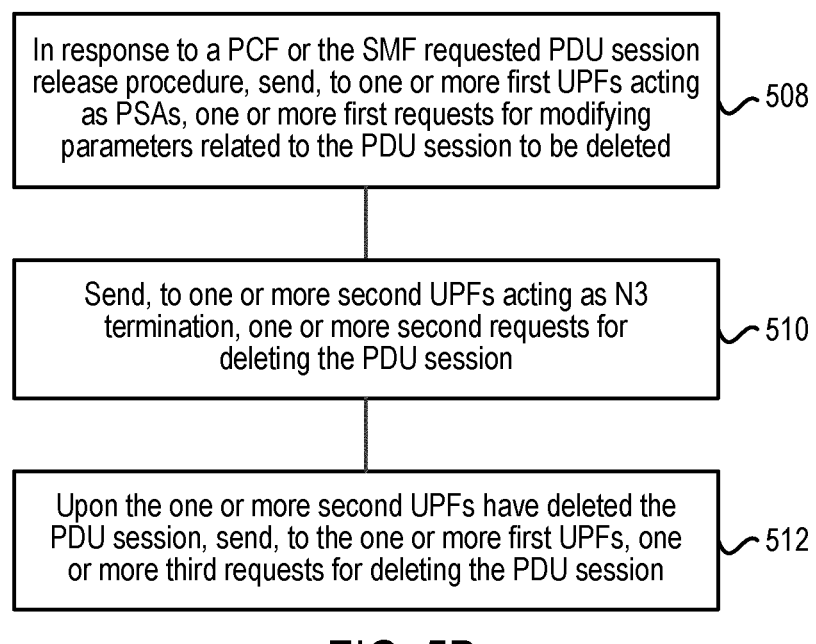

| SGW_C | | SGW_U | PGW_C | | PGW_U |

1. UE/MME/SGSN/HSS-initiated Detach procedure or UE/MME requested PDN disconnection procedure 2a. Sx Session Modification Request
Uplink,DROP
2b. Sx Session Modification Response
Uplink Payload
Dropped
Downlink Payload
Recorded for Charging
Downlink Payload
Recorded for Charging
Downlink Payload
3. Delete Session Request
4a. Sx Session Termination Request
4b. Sx Session Termination Response
Downlink Payload
Dropped
5. Delete Session Response
6a. Sx Session Termination Request
6b. Sx Session Termination Response

FIG. 6

METHODS AND APPARATUSES FOR CONTROL OF PACKET DATA CONNECTION

CROSS REFERENCE TO RELATED APPLICATIONS

This application is a 35 U.S.C. § 371 National Stage of International Patent Application No. PCT/EP2021/066459, filed Jun. 17, 2021, which also claims priority to Chinese Patent Application No. PCT/CN2020/104597, filed on Jul. 24, 2020. The above identified applications are incorporated by this reference.

TECHNICAL FIELD

Embodiments of the disclosure generally relate to communication, and, more particularly, to methods and apparatuses for control of packet data connection.

BACKGROUND

This section introduces aspects that may facilitate better understanding of the present disclosure. Accordingly, the statements of this section are to be read in this light and are not to be understood as admissions about what is in the prior art or what is not in the prior art.

In the architecture of 3rd generation partnership project (3GPP) release 16 (R16), the core network has been split into control plane and user plane. FIG. 1 illustrates the architecture reference model with control and user plane separation (CUPS) for non-roaming and roaming scenarios in evolved packet system (EPC). As shown, the control plane of the EPC may include serving gateway control plane (SGW-C) and packet data network (PDN) gateway control plane (PGW-C). The user plane of the EPC may include SGW user plane (SGW-U) and PGW user plane (PGW-U). FIG. 2 illustrates an exemplary architecture of 5th generation core (5GC). As shown, the control plane of the 5GC may include session management function (SMF) and the user plane of the 5GC may include user plane function (UPF).

The user plane interacts with the control plane through Sx/N4 interface and reports the corresponding traffic usage to the control plane. Then the control plane collects all the essential information and generates charging data record (CDR) or sends charging information to surround nodes such as charging function (CHF), charging gateway (CG) and online charging system (OCS).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for control of packet data connection. In particular, one of the problems to be solved by the disclosure is that when at least part of a packet data connection is deleted, there may be subscriber charging inconsistencies between multiple user plane entities connected in series in the existing solution.

According to a first aspect of the disclosure, there is provided a method performed by a user plane entity. The method may comprise receiving, from a control plane entity, a request for modifying parameters related to a packet data connection at least part of which is to be deleted. The method may further comprise, upon receipt of the request, stopping forwarding and counting of packets in only one of downlink and uplink directions for the at least part of the packet data connection to be deleted.

In this way, subscriber charging consistencies can be ensured thereby avoiding overcharging.

In an embodiment of the disclosure, the user plane entity may be a serving gateway user plane (SGW-U) and the control plane entity may be an SGW control plane (SGW-C).

In an embodiment of the disclosure, forwarding and counting of packets in only uplink direction may be stopped for the packet data connection to be deleted.

In an embodiment of the disclosure, the request may be received in response to one of: a user equipment (UE) initiated detach procedure; a mobility management entity (MME) initiated detach procedure; a home subscriber server (HSS) initiated detach procedure; a UE requested packet data network (PDN) disconnection procedure; and an MME requested PDN disconnection procedure.

In an embodiment of the disclosure, the user plane entity may be a PDN gateway user plane (PGW-U) and the control plane entity may be a PGW control plane (PGW-C).

In an embodiment of the disclosure, forwarding and counting of packets in only downlink direction may be stopped for one or more bearers to be deleted in the packet data connection.

In an embodiment of the disclosure, the request may be received in response to one of: an MME initiated dedicated bearer deactivation procedure; and a PGW initiated bearer deactivation procedure.

In an embodiment of the disclosure, the packet data connection may be a PDN connection.

In an embodiment of the disclosure, the request may be an Sx Session Modification Request.

In an embodiment of the disclosure, the user plane entity may be a user plane function (UPF) acting as N3 termination and the control plane entity may be a session management function (SMF).

In an embodiment of the disclosure, forwarding and counting of packets in only uplink direction may be stopped for the packet data connection to be deleted.

In an embodiment of the disclosure, the UPF acting as N3 termination may delete the packet data connection after one or more other UPFs acting as protocol data unit (PDU) session anchors (PSAs) delete the packet data connection.

In an embodiment of the disclosure, the request may be received in response to one of: a UE requested PDU session release procedure for non-roaming; a UE requested PDU session release procedure for roaming with local breakout; a UE requested PDU session release procedure for home-routed roaming; a serving network or access network requested PDU session release procedure for non-roaming; a serving network or access network requested PDU session release procedure for roaming with local breakout; and a serving network or access network requested PDU session release procedure for home-routed roaming.

In an embodiment of the disclosure, the user plane entity may be a UPF acting as a PSA and the control plane entity may be an SMF.

In an embodiment of the disclosure, forwarding and counting of packets in only downlink direction may be stopped for the packet data connection to be deleted.

In an embodiment of the disclosure, the UPF acting as the PSA may delete the packet data connection after one or more UPFs acting as N3 termination delete the packet data connection.

In an embodiment of the disclosure, the request may be received in response to one of: a policy control function (PCF) or SMF requested PDU session release procedure for non-roaming; a PCF or SMF requested PDU session release procedure for roaming with local breakout; and a PCF or SMF requested PDU session release procedure for home-routed roaming.

In an embodiment of the disclosure, the packet data connection may be a PDU session.

In an embodiment of the disclosure, the request may be an N4 Session Modification Request.

According to a second aspect of the disclosure, there is provided a method performed by an SMF. The method may comprise, in response to a UE or serving network or access network requested PDU session release procedure, sending, to one or more first UPFs acting as N3 termination, one or more first requests for modifying parameters related to the PDU session to be deleted. The method may further comprise sending, to one or more second UPFs acting as PSAs, one or more second requests for deleting the PDU session. The method may further comprise, upon the one or more second UPFs have deleted the PDU session, sending, to the one or more first UPFs, one or more third requests for deleting the PDU session.

According to a third aspect of the disclosure, there is provided a method performed by an SMF. The method may comprise, in response to a PCF or the SMF requested PDU session release procedure, sending, to one or more first UPFs acting as PSAs, one or more first requests for modifying parameters related to the PDU session to be deleted. The method may further comprise sending, to one or more second UPFs acting as N3 termination, one or more second requests for deleting the PDU session. The method may further comprise, upon the one or more second UPFs have deleted the PDU session, sending, to the one or more first UPFs, one or more third requests for deleting the PDU session.

According to a fourth aspect of the disclosure, there is provided an apparatus implementing a user plane entity. The apparatus may comprise at least one processor and at least one memory. The at least one memory may contain instructions executable by the at least one processor, whereby the apparatus may be operative to receive, from a control plane entity, a request for modifying parameters related to a packet data connection at least part of which is to be deleted. The apparatus may be further operative to, upon receipt of the request, stop forwarding and counting of packets in only one of downlink and uplink directions for the at least part of the packet data connection to be deleted.

In an embodiment of the disclosure, the apparatus may be operative to perform the method according to the above first aspect.

According to a fifth aspect of the disclosure, there is provided an apparatus implementing an SMF. The apparatus may comprise at least one processor and at least one memory. The at least one memory may contain instructions executable by the at least one processor, whereby the apparatus may be operative to, in response to a UE or serving network or access network requested PDU session release procedure, send, to one or more first UPFs acting as N3 termination, one or more first requests for modifying parameters related to the PDU session to be deleted. The apparatus may be further operative to send, to one or more second UPFs acting as PSAs, one or more second requests for deleting the PDU session. The apparatus may be further operative to, upon the one or more second UPFs have deleted the PDU session, send, to the one or more first UPFs, one or more third requests for deleting the PDU session.

According to a sixth aspect of the disclosure, there is provided an apparatus implementing an SMF. The apparatus may comprise at least one processor and at least one memory. The at least one memory may contain instructions executable by the at least one processor, whereby the apparatus may be operative to, in response to a PCF or the SMF requested PDU session release procedure, send, to one or more first UPFs acting as PSAs, one or more first requests for modifying parameters related to the PDU session to be deleted. The apparatus may be further operative to send, to one or more second UPFs acting as N3 termination, one or more second requests for deleting the PDU session. The apparatus may be further operative to, upon the one or more second UPFs have deleted the PDU session, send, to the one or more first UPFs, one or more third requests for deleting the PDU session.

According to a seventh aspect of the disclosure, there is provided a computer program product. The computer program product may comprise instructions which when executed by at least one processor, cause the at least one processor to perform the method according to any of the above first to third aspects.

According to an eighth aspect of the disclosure, there is provided a computer readable storage medium. The computer readable storage medium may comprise instructions which when executed by at least one processor, cause the at least one processor to perform the method according to any of the above first to third aspects.

According to a ninth aspect of the disclosure, there is provided an apparatus implementing a user plane entity. The apparatus may comprise a reception module for receiving, from a control plane entity, a request for modifying parameters related to a packet data connection at least part of which is to be deleted. The apparatus may further comprise a control module for, upon receipt of the request, stopping forwarding and counting of packets in only one of downlink and uplink directions for the at least part of the packet data connection to be deleted.

According to a tenth aspect of the disclosure, there is provided an apparatus implementing an SMF. The apparatus may comprise a modification module for, in response to a UE or serving network or access network requested PDU session release procedure, sending, to one or more first UPFs acting as N3 termination, one or more first requests for modifying parameters related to the PDU session to be deleted. The apparatus may further comprise a first deletion module for sending, to one or more second UPFs acting as PSAs, one or more second requests for deleting the PDU session. The apparatus may further comprise a second deletion module for, upon the one or more second UPFs have deleted the PDU session, sending, to the one or more first UPFs, one or more third requests for deleting the PDU session.

According to an eleventh aspect of the disclosure, there is provided an apparatus implementing an SMF. The apparatus may comprise a modification module for, in response to a PCF or the SMF requested PDU session release procedure, sending, to one or more first UPFs acting as PSAs, one or more first requests for modifying parameters related to the PDU session to be deleted. The apparatus may further comprise a first deletion module for sending, to one or more second UPFs acting as N3 termination, one or more second requests for deleting the PDU session. The apparatus may further comprise a second deletion module for, upon the one or more second UPFs have deleted the PDU session, sending, to the one or more first UPFs, one or more third requests for deleting the PDU session.

According to a twelfth aspect of the disclosure, there is provided a method implemented in a communication system including a control plane entity and a user plane entity. The method may comprise, at the control plane entity, sending, to the user plane entity, a request for modifying parameters related to a packet data connection at least part of which is to be deleted. The method may further comprise, at the user plane entity, receiving, from the control plane entity, the request for modifying parameters related to the packet data connection. The method may further comprise, at the user plane entity, upon receipt of the request, stopping forwarding and counting of packets in only one of downlink and uplink directions for the at least part of the packet data connection to be deleted.

According to a thirteenth aspect of the disclosure, there is provided a communication system comprising a control plane entity and a user plane entity. The control plane entity may be configured to send, to a user plane entity, a request for modifying parameters related to a packet data connection at least part of which is to be deleted. The user plane entity may be configured to: receive, from the control plane entity, the request for modifying parameters related to the packet data connection; and upon receipt of the request, stop forwarding and counting of packets in only one of downlink and uplink directions for the at least part of the packet data connection to be deleted.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 4 is a flowchart illustrating a method performed by a user plane entity according to an embodiment of the disclosure;

FIGS. 5A-5B are flowcharts each illustrating a method performed by an SMF according to an embodiment of the disclosure;

FIG. 6 is a flowchart illustrating an exemplary process in EPC according to an embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

According to the current 3GPP protocol, for the Detach/Deactivation procedures in CUPS, there is Sx modification procedure before Sx termination procedure for the purpose of stop counting and stop forwarding packets. When there is UE/MME/SGSN/HSS-initiated Detach procedure or UE/MME requested PDN disconnection, there is Sx modification message before Sx termination message. The term SGSN refers to serving GPRS support node and the term GPRS refers to general packet radio service. SGW-C will send an Sx Session Modification Request to SGW-U to indicate SGW-U to stop counting for the affected bearer(s). SGW-C shall also indicate the SGW-U to discard downlink packets received from PGW-U for the affected bearer(s), and discard uplink packets received from evolved node B (eNodeB) for the affected bearer(s).

When there is PDN gateway (GW) initiated bearer deactivation or MME initiated Dedicated Bearer Deactivation, PGW-C will send an Sx Session Modification Request to PGW-U to indicate PGW-U to stop counting and stop forwarding both uplink and downlink packets for the affected bearer(s).

For UE/MME/SGSN/HSS-initiated Detach procedure or UE/MME requested PDN disconnection procedure, if SGW-C indicates SGW-U to stop counting and stop forwarding packets for both uplink and downlink, PGW-U can still forward the downlink packets to SGW-U and recording those packets to CDR for charging, which means there will be subscriber charging inconsistencies between PGW-U and SGW-U for downlink packets.

For PDN GW initiated bearer deactivation or MME initiated Dedicated Bearer Deactivation, if PGW-C indicate PGW-U to stop counting and stop forwarding both uplink and downlink packets for the affected bearer(s), SGW-U can still forward uplink packets to PGW-U and recording those packets to CDR. This will cause subscriber charging inconsistencies between PGW-U and SGW-U for uplink packets.

The situation is similar in the 5GC architecture. In 5GC, if there are multiple UPFs associated with a PDU Session, all UPF resources that are used by the PDU Session will be released immediately during PDU Session Release procedure, therefore each UPF drops both uplink and downlink packets simultaneously.

Figure 3A:
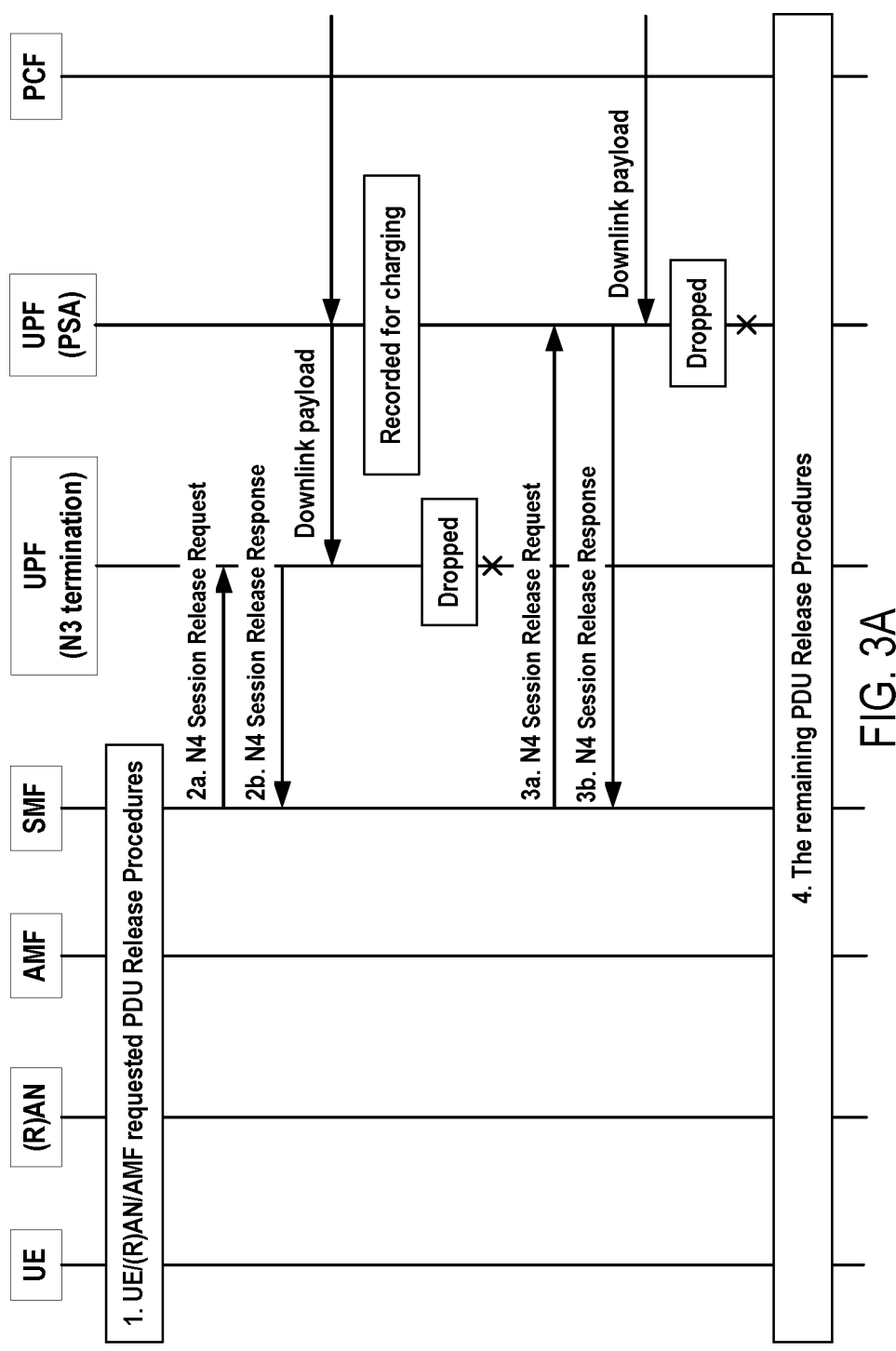
FIGS. 3A-3B are diagrams illustrating the problems with the existing solutions.

As shown in FIG. 3A, if UPFs (N3 termination) are released before the UPFs (PSAs) being released, the UPFs (PSAs) can still forward downlink packets and count those packets in charging. However, those packets will be discarded by the UPFs (N3 termination). This will cause the subscriber's downlink charging inconsistencies between multiple UPFs, which turns out overcharging in UPFs (PSAs).

Figure 3B:
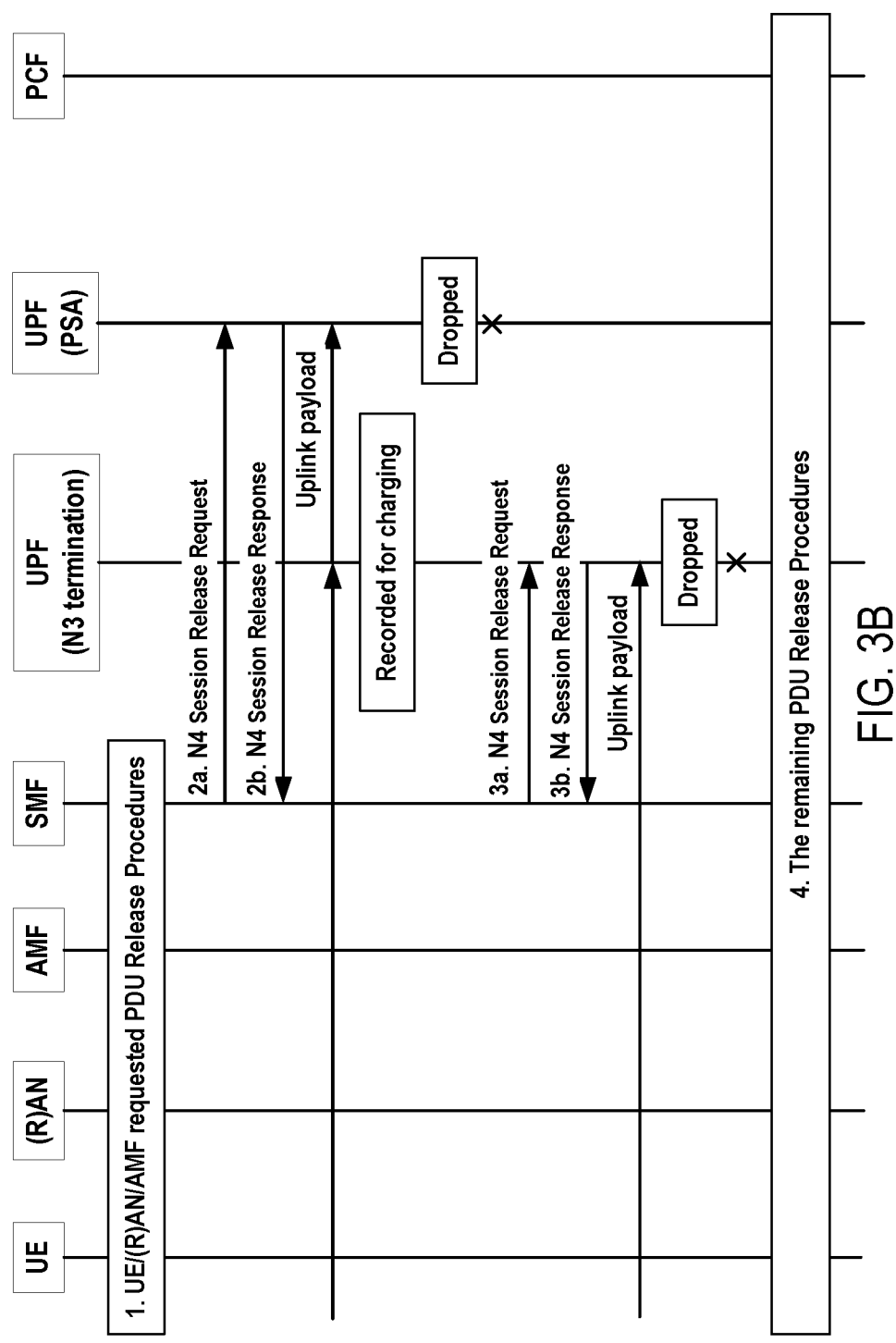

As shown in FIG. 3B, if UPFs (PSAs) are released before the UPFs (N3 termination) being released, the UPFs (N3 termination) can still forward uplink packets and count those packets in charging. However, those packets will be discarded by the UPFs (PSAs). This will cause the subscriber's uplink charging inconsistencies between multiple UPFs, which turns out overcharging in UPFs (PSAs).

The present disclosure proposes an improved solution for control of packet data connection. The basic idea is that in the Sx modification procedure of EPC, the SGW-C indicates the SGW-U to only stop counting and stop forwarding uplink packets. The PGW-C indicates the PGW-U to only stop counting and stop forwarding downlink packets. In the 5GC, the UPFs (N3 termination) shall drop any remaining uplink packets of the PDU Session before the UPFs (PSAs) being released. The UPFs (PSAs) shall drop any remaining downlink packets of the PDU Session before the UPFs (N3 termination) being released.

Figure 1:
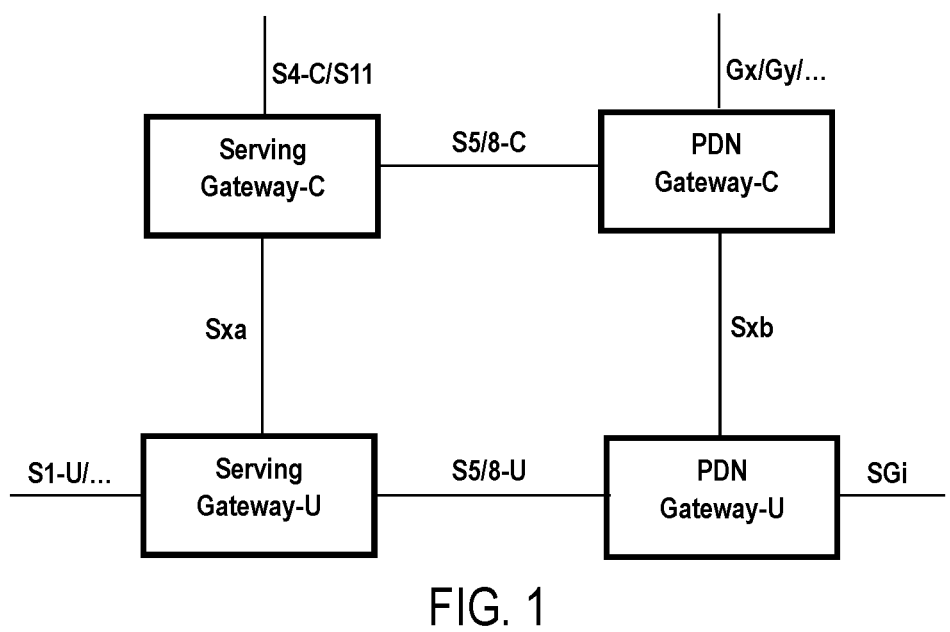
FIG. 1 is a diagram illustrating the CUPS in EPC.
Figure 2:
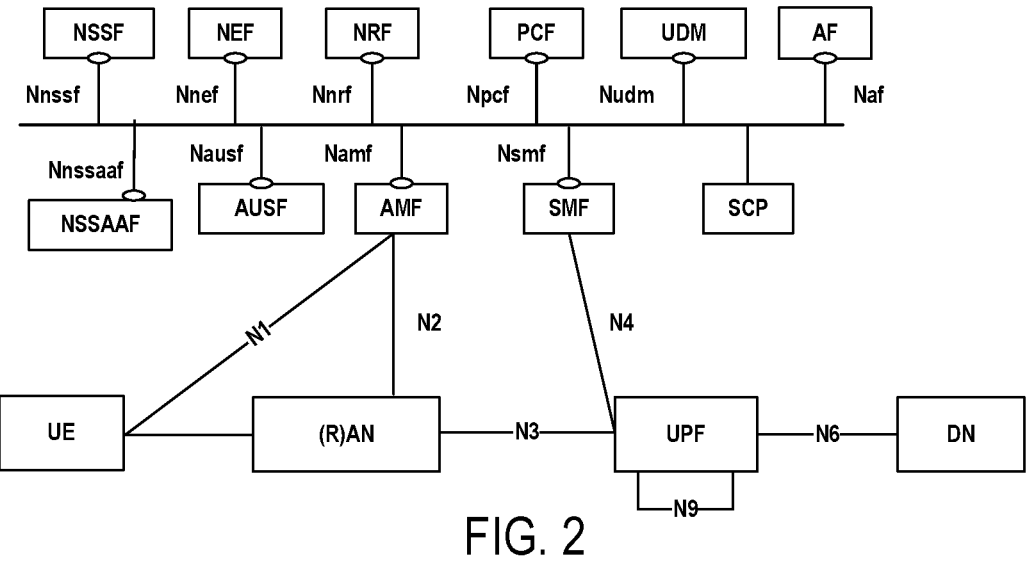
FIG. 2 is a diagram illustrating an exemplary architecture of 5GC.

As an exemplary example, the solution may be applied to the architectures shown in FIG. 1 and FIG. 2. Details of the architecture of FIG. 1 can be obtained from 3GPP technical specification (TS) 23.214 V16.1.0 and details of the architecture of FIG. 2 can be obtained from 3GPP TS 23.501 V16.5.0. Both are incorporated herein by reference in their entirety.

Note that within the context of this disclosure, the term UE or terminal device used herein may also be referred to as, for example, access terminal, mobile station, mobile unit, subscriber station, or the like. It may refer to any (stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a UE or terminal device may represent a machine or other device that performs monitoring and/or measurements, and transmits the results of such monitoring and/or measurements to another UE or terminal device and/or a network equipment. In this case, the UE or terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Hereinafter, the solution will be described in detail with reference to FIGS. 4-17. FIG. 4 is a flowchart illustrating a method performed by a user plane entity according to an embodiment of the disclosure. Note that the network entity or function mentioned in this document may be implemented either as a network element on a dedicated hardware, as a software instance running on a dedicated hardware, or as a virtualized function instantiated on an appropriate platform, e.g. on a cloud infrastructure. At block 402, the user plane entity receives, from a control plane entity, a request for modifying parameters related to a packet data connection at least part of which is to be deleted. Upon receipt of the request, the user plane entity stops, at block 404, forwarding and counting of packets in only one of downlink and uplink directions for the at least part of the packet data connection to be deleted. In this way, subscriber charging consistencies can be ensured thereby avoiding overcharging.

For example, the user plane entity and another user plane entity may be associated with the same packet data connection. The only one of downlink and uplink directions may be depending on the relative position between the two user plane entities. If the user plane entity (e.g. SGW-U or N3 termination UPF) is downstream of the another user plane entity (e.g. PGW-U or PSA UPF) and closest to RAN side, the only one of downlink and uplink directions is the uplink direction. On the other hand, if the user plane entity (e.g. PGW-U or PSA UPF) is upstream of the another user plane entity (e.g. SGW-U or N3 termination UPF) and closest to Data Network side, the only one of downlink and uplink directions is the downlink direction.

As a first option, the user plane entity may be an SGW-U and the control plane entity may be an SGW-C. For this option, forwarding and counting of packets in only uplink direction is stopped for the packet data connection (a PDN connection) to be deleted. For example, the request may be received in response to one of: a UE initiated detach procedure; an MME or SGSN initiated detach procedure; an HSS initiated detach procedure; a UE requested PDN disconnection procedure; and an MME requested PDN disconnection procedure.

As a second option, the user plane entity may be a PGW-U and the control plane entity may be a PGW-C. For this option, forwarding and counting of packets in only downlink direction is stopped for one or more bearers to be deleted in the packet data connection (a PDN connection). For example, the request may be received in response to one of: an MME initiated dedicated bearer deactivation procedure; and a PGW initiated bearer deactivation procedure. In the above first and second options, the request may be an Sx Session Modification Request.

As a third option, the user plane entity may be a UPF acting as N3 termination (such as uplink classifier, branching point, intermediate UPF, etc.), and the control plane entity may be an SMF. For this option, forwarding and counting of packets in only uplink direction is stopped for the packet data connection (a PDU session) to be deleted. For example, the request may be received in response to one of: a UE requested PDU session release procedure for non-roaming; a UE requested PDU session release procedure for roaming with local breakout; a UE requested PDU session release procedure for home-routed roaming; a serving network or access network requested PDU session release procedure for non-roaming; a serving network or access network requested PDU session release procedure for roaming with local breakout; and a serving network or access network requested PDU session release procedure for home-routed roaming. In addition, the UPF acting as N3 termination may delete the packet data connection after one or more other UPFs acting as PSAs delete the packet data connection.

As a fourth option, the user plane entity may be a UPF acting as a PSA and the control plane entity is an SMF. For this option, forwarding and counting of packets in only downlink direction is stopped for the packet data connection (a PDU session) to be deleted. For example, the request may be received in response to one of: a PCF or SMF requested PDU session release procedure for non-roaming; a PCF or SMF requested PDU session release procedure for roaming with local breakout; and a PCF or SMF requested PDU session release procedure for home-routed roaming. In addition, the UPF acting as the PSA may delete the packet data connection after one or more UPFs acting as N3 termination delete the packet data connection. In the above third and fourth options, the request may be an N4 Session Modification Request.

Note that in the above examples for implementing blocks 402 and 404, the modification request received at block 402 may be the same as the existing modification request and the user plane entity may be configured to perform block 404 in response to receiving the modification request. Alternatively, it is also possible that the existing modification request is modified to explicitly indicate to stop forwarding and counting of packets in only one of downlink and uplink directions for the at least part of the packet data connection to be deleted.

FIG. 5A is a flowchart illustrating a method performed by an SMF according to an embodiment of the disclosure. At block 502, in response to a UE or serving network or access network requested PDU session release procedure, the SMF sends, to one or more first UPFs acting as N3 termination, one or more first requests for modifying parameters related to the PDU session to be deleted. For example, the first request may be an N4 Session Modification Request. At block 504, the SMF sends, to one or more second UPFs acting as PSAs, one or more second requests for deleting the PDU session. At block 506, upon the one or more second UPFs have deleted the PDU session, the SMF sends, to the one or more first UPFs, one or more third requests for deleting the PDU session. For example, the second or third request may be an N4 Session Release Request. With the method of FIG. 5A, subscriber charging consistencies can be ensured thereby avoiding overcharging.

FIG. 5B is a flowchart illustrating a method performed by an SMF according to an embodiment of the disclosure. At block 508, in response to a PCF or the SMF requested PDU session release procedure, the SMF sends, to one or more first UPFs acting as PSAs, one or more first requests for modifying parameters related to the PDU session to be deleted. For example, the first request may be an N4 Session Modification Request. At block 510, the SMF sends, to one or more second UPFs acting as N3 termination, one or more second requests for deleting the PDU session.

At block 512, upon the one or more second UPFs have deleted the PDU session, the SMF sends, to the one or more first UPFs, one or more third requests for deleting the PDU session. For example, the second or third request may be an N4 Session Release Request. With the method of FIG. 5B, subscriber charging consistencies can be ensured thereby avoiding overcharging.

Based on the above description, one aspect of the disclosure provides a method implemented in a communication system including a control plane entity and a user plane entity. The method may comprise, at the control plane entity, sending, to the user plane entity, a request for modifying parameters related to a packet data connection at least part of which is to be deleted. The method may further comprise, at the user plane entity, receiving, from the control plane entity, the request for modifying parameters related to the packet data connection. The method may further comprise, at the user plane entity, upon receipt of the request, stopping forwarding and counting of packets in only one of downlink and uplink directions for the at least part of the packet data connection to be deleted.

In addition, another aspect of the disclosure provides a communication system comprising a control plane entity and a user plane entity. The control plane entity may be configured to send, to a user plane entity, a request for modifying parameters related to a packet data connection at least part of which is to be deleted. The user plane entity may be configured to: receive, from the control plane entity, the request for modifying parameters related to the packet data connection; and upon receipt of the request, stop forwarding and counting of packets in only one of downlink and uplink directions for the at least part of the packet data connection to be deleted.

FIG. 6 is a flowchart illustrating an exemplary process in EPC according to an embodiment of the disclosure. At step 1, the UE/MME/SGSN/HSS initiates Detach procedure or UE/MME requests PDN disconnection, in which the SGW-C marks the connection to be deleted. At steps 2a and 2b, the SGW-C indicates the SGW-U to stop counting and stop forwarding uplink packets for the affected bearer(s). At step 3, the SGW-C sends Delete Session Request message to the PGW-C. At steps 4a and 4b, the PGW-C sends an Sx Session Termination Request to the PGW-U to release the Sx session. At step 5, the PGW-C sends Delete Session Response message to the SGW-C. At steps 6a and 6b, the SGW-C sends an Sx Session Termination Request to the SGW-U to release the Sx session.

Figure 7:
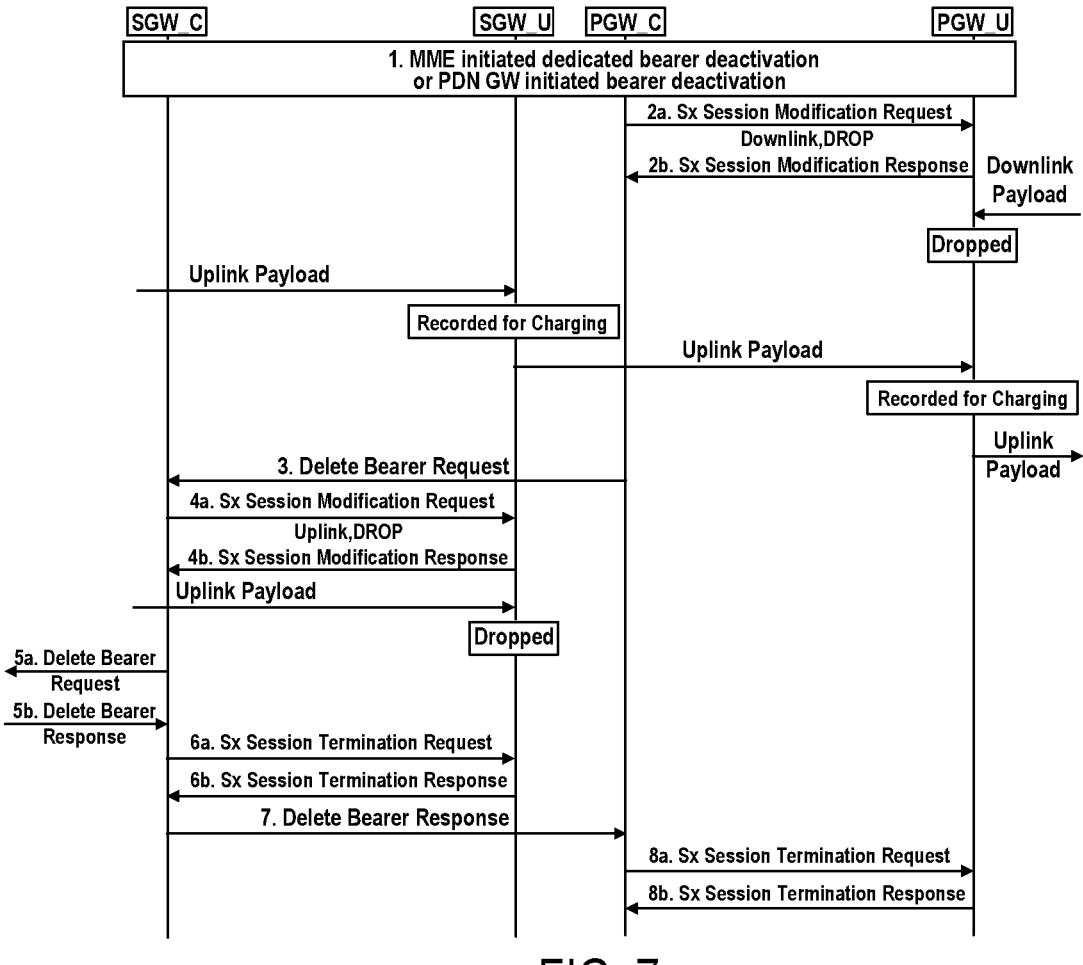
FIG. 7 is a flowchart illustrating an exemplary process in EPC according to an embodiment of the disclosure.

FIG. 7 is a flowchart illustrating an exemplary process in EPC according to an embodiment of the disclosure. At step 1, the MME or PDN GW initiates bearer deactivation, in which the PGW-C marks the bearer to be deleted. At steps 2a and 2b, the PGW-C indicates the PGW-U to stop counting and stop forwarding downlink packets for the affected bearer(s). At step 3, the PGW-C sends a Delete Bearer Request message to the SGW-C. At steps 4a and 4b, the SGW-C indicates the SGW-U to stop counting and stop forwarding uplink packets for the affected bearer(s). At steps 5a and 5b, the SGW-C sends a Delete Bearer Request message to the MME. At steps 6a and 6b, the SGW-C indicates the SGW-U to remove the packet detection rule(s) (PDR(s)) for the affected bearer(s). At step 7, the SGW-C sends Delete Bearer Response to the PGW-C. At steps 8a and 8b, the PGW-C indicates the PGW-U to remove the PDR(s) for the affected bearer(s).

Figure 8:
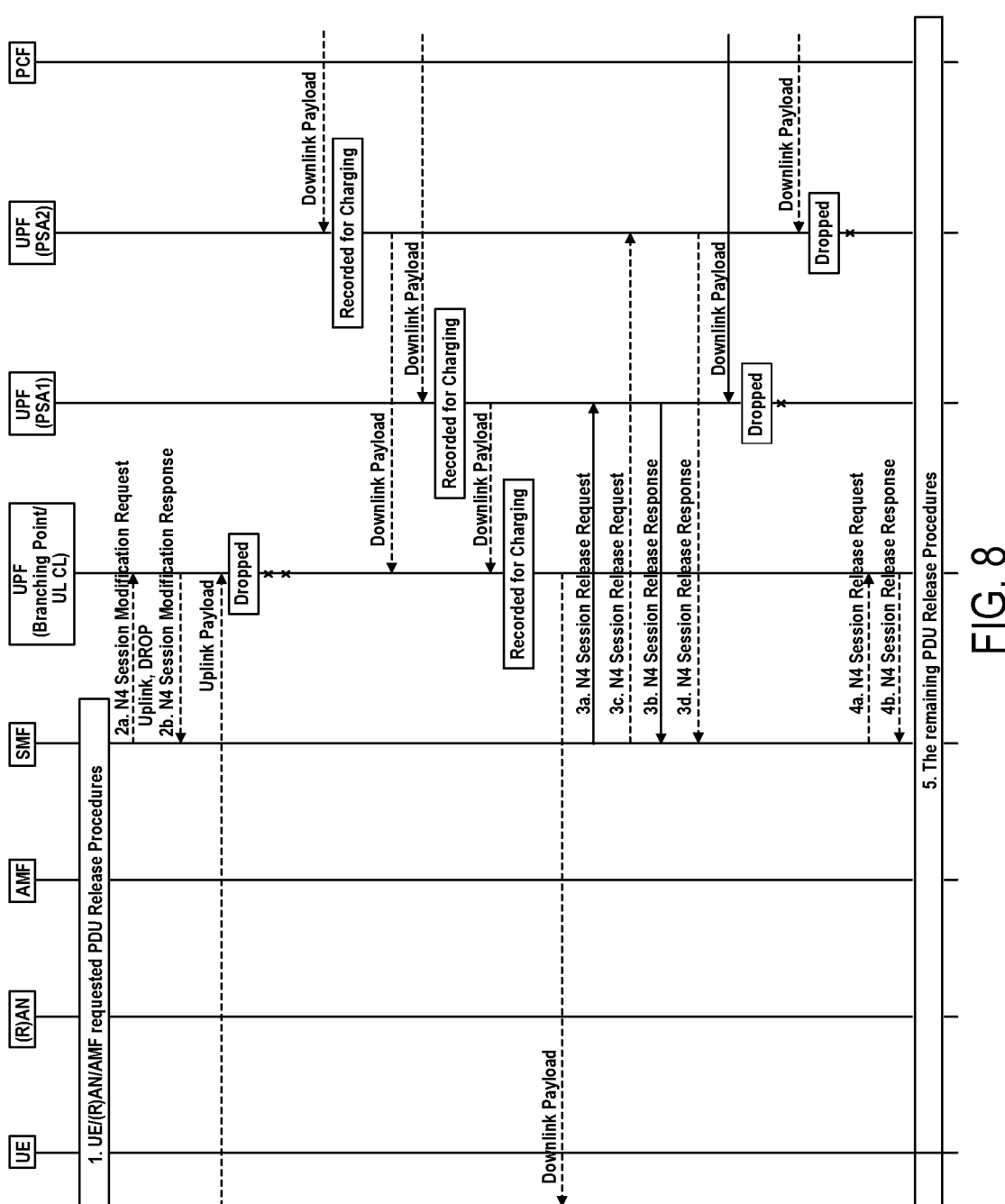
FIG. 8 is a flowchart illustrating an exemplary process in 5GC according to an embodiment of the disclosure.

FIG. 8 is a flowchart illustrating an exemplary process in 5GC according to an embodiment of the disclosure. At step 1, the UE or Serving network or (R)AN or AMF requests PDU Session Release for non-roaming and roaming with local breakout. At steps 2a and 2b, the SMF sends an N4 modification request to indicate UPF (N3 termination) to drop any remaining uplink packets of the PDU Session. The symbol "X" in the figure means that any further forwarding of the packets is stopped. At steps 3a-3d, the SMF sends an N4 release request to indicate the UPFs (PSAs) to drop any remaining packets of the PDU Session and release all tunnel resource and contexts associated with the N4 Session. At steps 4a and 4b, the SMF send an N4 release request to the remaining UPFs to drop any remaining packets of the PDU Session and release all tunnel resource and contexts associated with the N4 Session. At step 5, the remaining PDU Release Procedures are performed.

Figure 9:
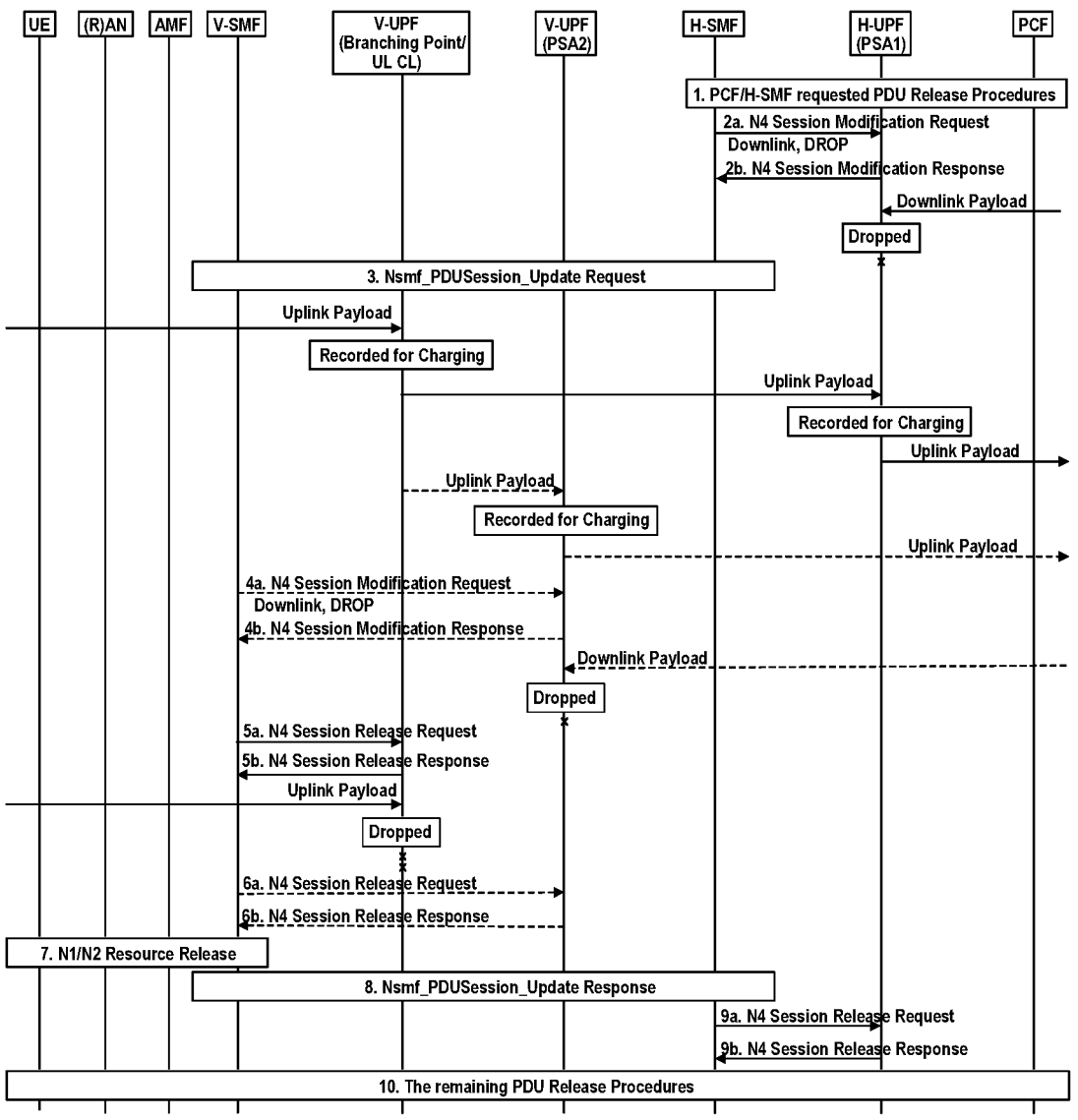
FIG. 9 is a flowchart illustrating an exemplary process in 5GC according to an embodiment of the disclosure.

FIG. 9 is a flowchart illustrating an exemplary process in 5GC according to an embodiment of the disclosure. At step 1, the PCF/H-SMF requests PDU Session Release Procedures for home-routed roaming. At steps 2a and 2b, the H-SMF sends an N4 modification request to indicate H-UPF (PSA1) to drop any remaining downlink packets of the PDU Session. At step 3, the H-SMF prepares the SM Release PDU Session Command message and initiates the PDU Session Release towards the UE by invoking the Nsmf_P-DUSession_Update Request service operation towards the V-SMF. At steps 4a and 4b, the V-SMF sends an N4 modification request to indicate V-UPF (PSA2) to drop any remaining downlink packets of the PDU Session. At steps 5a and 5b, the V-SMF sends an N4 release request to indicate the UPF (N3 termination) to drop any remaining packets of the PDU Session and release all tunnel resource and contexts associated with the N4 Session. At steps 6a and 6b, the V-SMF sends an N4 release request to the remaining UPFs to drop any remaining packets of the PDU Session and release all tunnel resource and contexts associated with the N4 Session. At step 7, the N1/N2 Resource Release is performed. At step 8, the V-SMF responds to the Nsmf_P-DUSession_Update Request invoked at step 3 and confirms the PDU Session Release. At steps 9a and 9b, the H-SMF send an N4 release request to the remaining UPFs to drop any remaining packets of the PDU Session and release all tunnel resource and contexts associated with the N4 Session. At step 10, the remaining PDU Release Procedures are performed.

Based on the above description, the following changes are proposed to be made to 3GPP TS 23.214 16.0.0, where the changes are highlighted with underlines.

6.3.1.6 Procedures with Release of PDN Connection

. . .

1. Procedure as listed in this step is initiated as specified in the relevant clauses of this specification. The relevant steps of the procedure as specified in the figure above are executed.

2. The SGW-C sends an Sx Session Modification Request to the SGW-U. SGW-C shall indicate SGW-U to stop counting uplink packets for the affected bearers. SGW-C shall also indicate the SGW-U to discard uplink packets received from eNodeB for the affected bearers.

. . .

6.3.1.7 Procedures with Modification of Bearer

. . .

1. Procedure as listed in this step is initiated as specified in the relevant clauses of this specification. The relevant steps of the procedure as specified in the figure above are executed.

2. The PGW-C sends an Sx Session Modification Request to the PGW-U. For "Dedicated bearer activation", PGW-C may indicate PGW-U to allocate F-TEID for the dedicated bearer. For "PGW/MME initiated bearer deactivation procedure", PGW-C shall indicate PGW-U to stop counting and stop forwarding downlink packets for the affected bearer(s).

3. The PGW-U sends an Sx Session Modification Response to the PGW-C confirming the successful modification of the Sx session.

4. The relevant steps of the procedure as specified in the figure above are executed.

5. The SGW-C sends an Sx Session Modification Request to the SGW-U. For "Dedicated bearer activation", SGW-C may indicate SGW-U to allocate F-TEID for the dedicated bearer. For "PGW/MME initiated bearer deactivation procedure", SGW-C shall indicate SGW-U to stop counting and stop forwarding uplink packets for the affected bearer(s).

. . .

6.3.4.1.1 Procedures with SGSN Terminating S4 Interface

. . .

1. Procedure as listed in this step is initiated as specified in the relevant clauses of this specification. The relevant steps of the procedure as specified in the figure above are executed.

2a. The SGW-C sends an Sx Session Modification Request to the SGW-U to modify the Sx session. SGW-C shall request SGW-U to stop counting uplink packets for the affected bearers. SGW-C shall also request the SGW-U to discard uplink packets received from eNodeB for the affected bearers.

2b. The SGW-U sends an Sx Session Modification Response to the SGW-C confirming the modification of the Sx session.

2c. The relevant steps of the procedure as specified in the figure above are executed.

3a. The PGW-C may send an Sx Session Termination Request to the PGW-U to release the Sx session.

3b. The PGW-U sends an Sx Session Termination Response to the PGW-C confirming the release of the Sx session.

3c. The relevant steps of the procedure as specified in the figure above are executed.

3d. The SGW-C may send an Sx Session Termination Request to the SGW-U to release the Sx session.

3e. The SGW-U sends an Sx Session Termination Response to the SGW-C confirming the release of the Sx session.

4. The relevant steps of the procedure as specified in the figure above are executed.

5a. The SGW-C may send an Sx Session Modification Request to the SGW-U in detach and Bearer Deactivation procedures. SGW-C shall indicate SGW-U to stop counting uplink packets for the affected bearers. SGW-C shall also indicate the SGW-U to discard uplink packets received from eNodeB for the affected bearers.

. . .

6.3.4.1.2 Procedures with SGSN Terminating Gn/Gp Interface

. . .

1. Procedure as listed in this step is initiated as specified in the relevant clauses of this specification. The relevant steps of the procedure as specified in the figure above are executed.

2a. The PGW-C sends an Sx Session Modification Request to the PGW-U when it initiates bearer deactivation procedure. PGW-C shall indicate PGW-U to stop counting downlink packets for the affected bearers. PGW-C shall also indicate the PGW-U to discard downlink packets received for the affected bearers.

Figure 10:
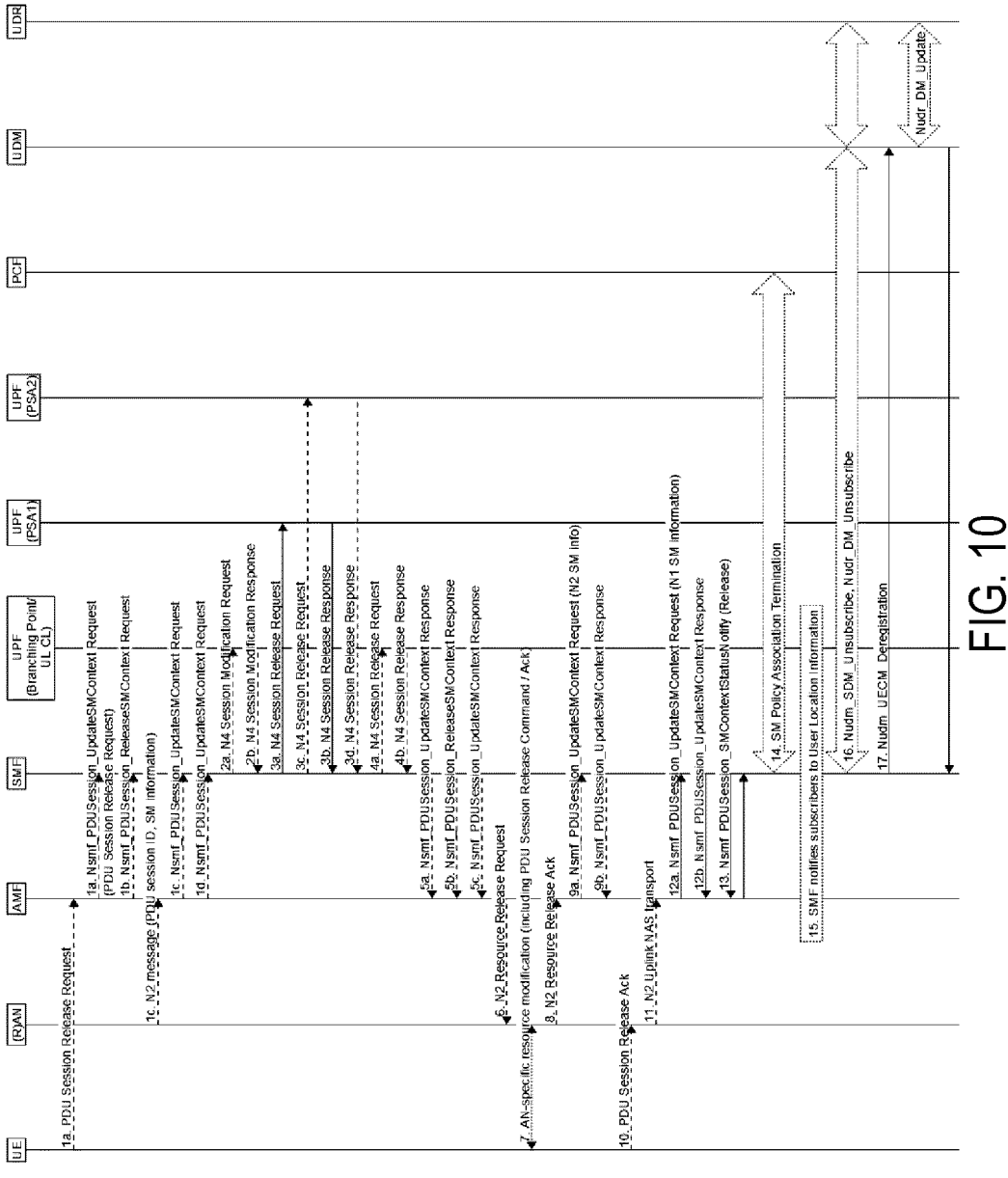
FIG. 10 is a flowchart illustrating an exemplary process in 5GC according to an embodiment of the disclosure.

In addition, the following first change is proposed to be made to 3GPP TS 23.502 V16.0.0, where FIG. 10 is FIG. 4.3.4.2.1-1 after the first change and the following text is the text after the first change.

4.3.4.2 UE or Network Requested PDU Session Release for Non-Roaming and Roaming with Local Breakout This procedure is used in the case of non-roaming and roaming with local breakout scenarios. FIG. 4.3.4.2.1-1 captures UE, Serving network or (R)AN Requested PDU Session Release procedure. The procedure allows the UE, the Serving network or the (R)AN to initiate the release of a PDU Session. FIG. 4.3.4.2.2-1 captures PCF or SMF requested PDU Session Release procedure. The procedure allows the PCF or the SMF to initiate the release of a PDU Session. In the case of LBO, the procedure is as in the case of non-roaming with the difference that the AMF, the SMF, the UPF and the PCF are located in the visited network.

4.3.4.2.1 UE, Serving network or (R)AN requested PDU Session Release for Non-Roaming and Roaming with Local Breakout This clause defines PDU Session Release for Non-Roaming and Roaming with Local Breakout during the following procedures:

UE initiated release.
Serving network initiated release.
(R)AN initiated release.

FIG. 4.3.4.2.1-1: UE, Serving network or (R)AN requested PDU Session Release for non-roaming and roaming with local breakout 1. The procedure is triggered by one of the following events:
   1a. (UE requested) The UE initiates the UE Requested PDU Session Release procedure by the transmission of an NAS message (N1 SM container (PDU Session Release Request (PDU session ID)), PDU Session ID) message. The NAS message is forwarded by the (R)AN to the AMF with an indication of User Location Information. This message is relayed to the SMF corresponding to the PDU Session ID via N2 and the AMF. The AMF invokes the Nsmf_PDUSession_UpdateSMContext service operation and provides the N1 SM container to the SMF together with User Location Information (ULI) received from the (R)AN.
   NOTE 1: Depending on the Access Type, when the UE is in CM-IDLE state, the UE can trigger a Service Request procedure before being able to release the PDU Session.
   1b. The AMF may invoke the Nsmf_PDUSession_ReleaseSMContext service operation to request the release of the PDU Session in the case of mismatch of PDU Session status between UE and AMF or other cases where neither N1 nor N2 SM signalling is needed before the releasing of SM context.
   1c. (R)AN may decide to indicate to the SMF that the PDU Session related resource is released, e.g. when all the QoS Flow(s) of the PDU Session are released.
   NOTE 2: In this case, it's up to SMF to decide whether to keep the PDU Session with user plane connection deactivated or release the PDU Session.
   If the SMF receives one of the triggers in step 1a or 1b the SMF starts PDU Session Release procedure.
   1d. The AMF may invoke the Nsmf_PDUSession_UpdateSMContext service operation with a release indication to request the release of the PDU Session where N1 or N2 SM signalling may be needed before releasing the SM context (e.g. due to a change of the set of network slices for a UE where a network slice instance is no longer available as described in TS 23.501 [2] clause 5.15.5.2.2 or the AAA Server triggered Network Slice-Specific Re-authentication and Re-authorization procedure fails as specified in clause 4.2.9.2 or the AAA Server triggered Slice-Specific Authorization Revocation takes place as specified in clause 4.2.9.4 or AMF determines that Control Plane Only indication associated with PDU Session is not applicable any longer as described in TS 23.501 [2] clause 5.31.4.1).

2. If there are multiple UPFs associated with the PDU Session (e.g. due to the insertion of UL CL or Branching Point, or redundant I-UPFs if the redundant I-UPFs are used for URLLC), the following procedure is triggered.
   2a. The SMF sends an N4 Session Modification Request message to the UL CL or Branching Point or redundant I-UPFs (including N3 termination) of the PDU Session. The UPF(s) shall drop any remaining uplink packets of the PDU Session.
   2b. The UPF(s) acknowledges the N4 Session Modification Request by the transmission of an N4 Session Modification Response message to the SMF.

3. The SMF releases the IP address/Prefix(es) that were allocated to the PDU Session and releases the corresponding User Plane resources (including PSAs):
   3a. The SMF sends an N4 Session Release Request (N4 Session ID) message to the UPF(s) (including PSAs) of the PDU Session. The UPF(s) shall drop any remaining packets of the PDU Session and release all tunnel resource and contexts associated with the N4 Session.
   3b. The UPF(s) acknowledges the N4 Session Release Request by the transmission of an N4 Session Release Response (N4 Session ID, [Small Data Rate Control Status], [APN Rate Control Status]) message to the SMF.
   The UPF includes Small Data Rate Control Status if the PDU Session used Small Data Rate Control.
   3c. This includes the same procedure in step 3a.
   3d. This includes the same procedure in step 3b.
   If a NEF has been selected as anchor of the Control Plane CIoT 5GS Optimisation enabled PDU session which is Unstructured PDU Session Type as described in clause 4.3.2.2 and the SMF-NEF Connection is released for this PDU Session.
   NOTE 3: If there is only one UPF associated with the PDU Session or if there are multiple UPFs associated with the PDU Session but the UPFs (N3 termination) and the PSA2 are co-located in a single UPF then steps 3c-3d are skipped.

4. If there are multiple UPFs associated with the PDU Session (e.g. due to the insertion of UL CL or Branching Point, or redundant I-UPFs if the redundant I-UPFs are used for URLLC), the following procedure is triggered.
   4a. The SMF sends an N4 Session Release Request message to the UL CL or Branching Point or redundant I-UPFs (including N3 termination) of the PDU Session. The UPF(s) shall drop any remaining packets of the PDU Session and release all tunnel resource and contexts associated with the N4 Session.
   4b. The UPF(s) acknowledges the N4 Session Release Request by the transmission of an N4 Session Release Response message to the SMF.

NOTE4: If the UPFs (N3 termination) and the PSA2 are co-located in a single UPF, the SMF also releases the IP address/Prefix(es) that were allocated to the PDU Session.

5 If the PDU Session Release procedure was triggered by steps 1a, or 1c above, the SMF creates an N1 SM including PDU Session Release Command message (PDU Session ID, Cause). The Cause may indicate a trigger to establish a new PDU Session with the same characteristics (e.g. when procedures related with SSC mode 2 are invoked).

If the User Plane connection of the PDU Session is activated, the message sent by the SMF to the AMF shall include N2 SM Resource Release request. If the User Plane connection of the PDU Session is not activated, the message sent by the SMF to the AMF shall not include N2 SM Resource Release request.

NOTE 5: SSC modes are defined in TS 23.501 [2] clause 5.6.9.

5a. (If the PDU Session Release is initiated by the UE in step 1a or has been triggered by (R)AN in step 1c) The SMF responds to the AMF with the Nsmf_PDUSession_UpdateSMContext response (N2 SM Resource Release request, N1 SM container (PDU Session Release Command)). N2 SM Resource Release request is included if the PDU Session Release is initiated by the UE and if the UP connection of the PDU Session is active.

5b. If the PDU Session Release is initiated by the AMF in step 1b, i.e. the SMF received the Nsmf_PDUSession_ReleaseSMContext Request from the AMF, the SMF responds to the AMF with the Nsmf_PDUSession_ReleaseSMContext response, optionally including the Small Data Rate Control Status and APN Rate Control Status.

If the UPF included APN Rate Control Status and/or Small Data Rate Control Status in step 3 then the SMF includes APN Rate Control and/or Small Data Rate Control Status and the AMF stores the Small Data Rate Control Status and/or the APN Rate Control Status in the UE context in AMF.

The AMF and SMF shall remove all contexts (including the PDU Session ID) associated with the PDU Session which are indicated as released at the UE. The SMF shall remove any event subscriptions on the AMF by the SMF that becomes no more needed due to the PDU Session Release. The steps 6 to 13 are skipped.

5c. If the PDU Session Release is initiated by the AMF in step 1d, i.e. the SMF received the Nsmf_PDUSession_UpdateSMContext Request from the AMF with a release indication to request the release of the PDU Session, the SMF responds to the AMF with the Nsmf_PDUSession_UpdateSMContext Response which may contain the N1 SM container (PDU Session Release Command) to release the PDU session at the UE.

If the UP connection of the PDU Session is active, the Nsmf_PDUSession_UpdateSMContext Response shall also include the N2 Resource Release request (PDU Session ID) to release the (R)AN resources associated with the PDU Session.

6. If the UE is in CM-IDLE state and "N1 SM delivery can be skipped" is not indicated, the AMF initiates the network triggered Service Request procedure to transmit the NAS message (PDU Session ID, N1 SM container) to the UE and the steps 8, 9 are skipped.

If the message received from the SMF in step 5 does not include N2 SM Resource Release request, the AMF transmits the NAS message (PDU Session ID, N1 SM container) to the UE and the steps 8, 9 are skipped.

If the PDU Session is Control Plane CIoT 5GS Optimisation enabled, the SMF shall not include N2 SM Resource Release request in the message sent to the AMF, the AMF transmits the NAS message (PDU Session ID, N1 SM container) to the UE and the steps 8, 9 are skipped.

If the UE is in CM-CONNECTED state and the received message from the SMF in step 5 includes N2 SM Resource Release request, the AMF transfers the SM information received from the SMF in step 5 (N2 SM Resource Release request, N1 SM container) to the (R)AN.

If the message from the SMF includes Small Data Rate Control Status then the AMF stores it in the UE Context in AMF.

7. When the (R)AN has received an N2 SM request to release the AN resources associated with the PDU Session it issues AN specific signalling exchange(s) with the UE to release the corresponding AN resources.

In the case of a NG-RAN, the NAS message is sent to the UE in an RRC message which may take place with the UE releasing the NG-RAN resources related to the PDU Session. If NG-RAN resources do not need to be released (i.e. the User Plane of the PDU Session is deactivated), the NAS message is sent to the UE in an RRC message which does not release the NG-RAN resources related to the PDU Session.

During this procedure, the (R)AN sends any NAS message (N1 SM container (PDU Session Release Command)) received from the AMF in step 6.

8. [Conditional] If the (R)AN had received a N2 SM request to release the AN resources, the (R)AN acknowledges the N2 SM Resource Release Request by sending an N2 SM Resource Release Ack (User Location Information, Secondary RAT usage data) Message to the AMF.

If the PLMN has configured secondary RAT usage reporting, the NG-RAN node may provide RAN Usage Data Report.

9a. The AMF invokes the Nsmf_PDUSession_UpdateSMContext (N2 SM Resource Release Ack (Secondary RAT usage data), User Location Information) to the SMF.

9b. The SMF responds to the AMF with an Nsmf_PDUSession_UpdateSMContext response.

10. The UE acknowledges the PDU Session Release Command by sending a NAS message (PDU Session ID, N1 SM container (PDU Session Release Ack)) message over the (R)AN.

11. [Conditional] The (R)AN forwards the NAS message from the UE by sending a N2 NAS uplink transport (NAS message (PDU Session ID, N1 SM container (PDU Session Release Ack)), User Location Information) to the AMF.

12a. The AMF invokes the Nsmf_PDUSession_UpdateSMContext (N1 SM container (PDU Session Release Ack, User Location Information) to the SMF.

12b. The SMF responds to the AMF with an Nsmf_PDUSession_UpdateSMContext response. Steps 10-12 may happen before steps 8-9.

13. If steps 5a or 5c were performed, the SMF waits until it has received replies to the N1 and N2 information provided in step 5, as needed.

The SMF invokes Nsmf_PDUSession_SMContextStatusNotify to notify AMF that the SM context for this PDU Session is released. If the UPF included Small Data Rate Control Status and/or APN Rate Control Status in step 3 then the SMF includes Small Data Rate Control Status and/or APN Rate Control Status in its request to the AMF in this step. The AMF releases the association between the SMF ID and the PDU Session ID, DNN, as well as S-NSSAI and stores the Small Data Rate Control Status and/or the APN Rate Control Status in the UE context in AMF. The SMF shall remove any event subscriptions on the AMF that becomes no more needed due to the PDU Session Release.

NOTE 5: The UE and the 5GC will get synchronized about the status of the (released) PDU Session at the next Service Request or Registration procedure.

14. If Dynamic PCC applied to this session the SMF invokes an SM Policy Association Termination procedure as defined in clause 4.16.6 to delete the PDU Session.

15. SMF notifies any entity that has subscribed to User Location Information related with PDU Session change.

16. If it is the last PDU Session the SMF is handling for the UE for the associated (DNN, S-NSSAI), the SMF unsubscribes from Session Management Subscription data changes notification with the UDM by means of the Nudm_SDM_Unsubscribe (SUPI, DNN, S-NSSAI) service operation. The UDM may unsubscribe the subscription notification from UDR by Nudr_DM_Unsubscribe (SUPI, Subscription Data, Session Management Subscription data, DNN, S-NSSAI).

17. The SMF invokes the Nudm_UECM Deregistration service operation including the DNN and the PDU Session Id. The UDM removes the association it had stored between the SMF identity and the associated DNN and PDU Session Id. The UDM may update this information by Nudr_DM_Update (SUPI, Subscription Data, UE context in SMF data).

Figure 11:
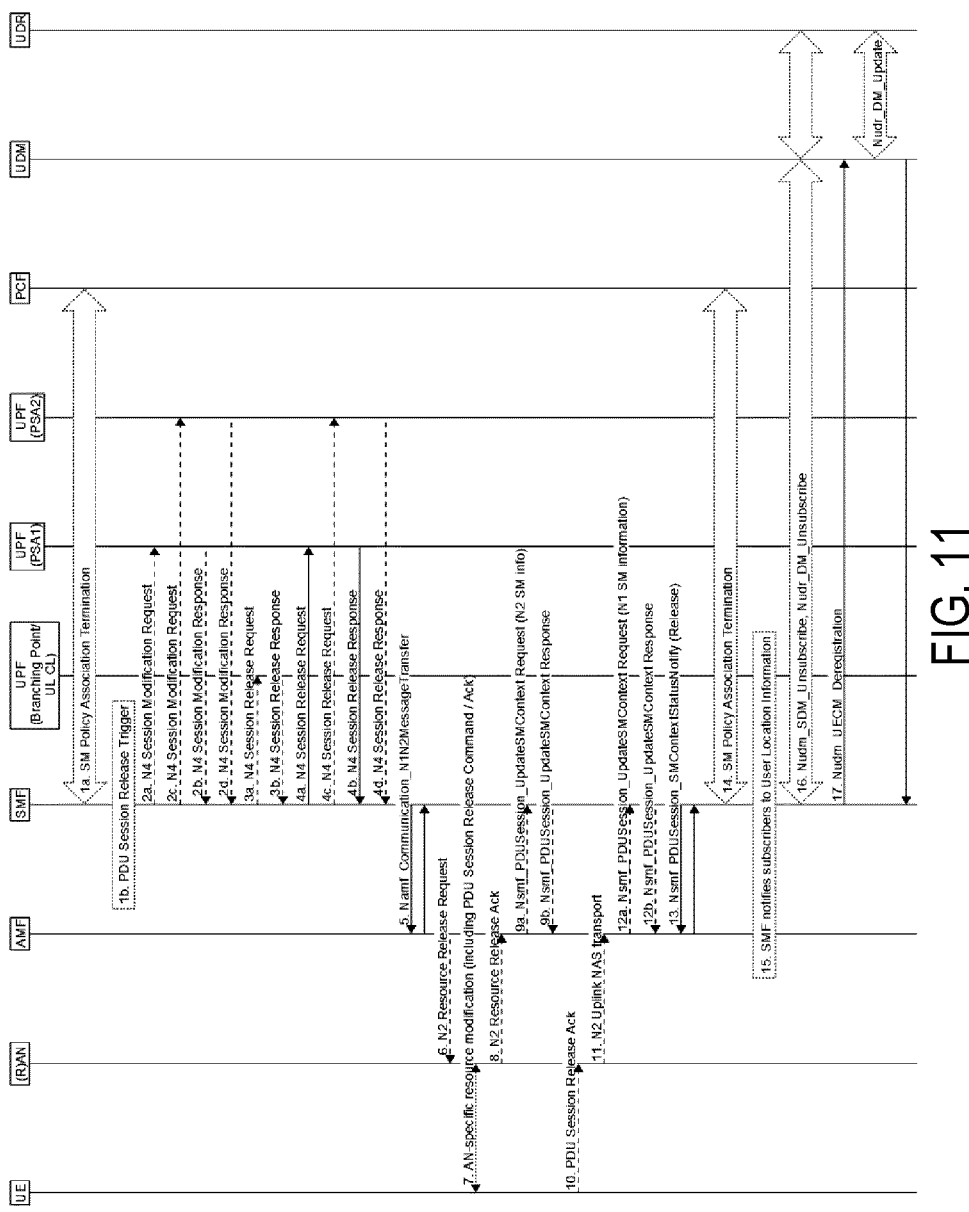
FIG. 11 is a flowchart illustrating an exemplary process in 5GC according to an embodiment of the disclosure.

The following second change is proposed to be made to 3GPP TS 23.502 V16.0.0, where FIG. 11 is FIG. 4.3.4.2.2-1 after the second change and the following text is the text after the second change.

4.3.4.2.2 PCF or SMF Requested PDU Session Release for Non-Roaming and Roaming with Local Breakout This clause defines PDU Session Release for Non-Roaming and Roaming with Local Breakout during the following procedures:

PCF initiated release.

SMF initiated release.

FIG. 4.3.4.2.1-1: PCF or SMF requested PDU Session Release for non-roaming and roaming with local breakout 1. The procedure is triggered by one of the following events:

1a. (PDU Session Release initiated by the PCF) The PCF may invoke an SM Policy Association Termination procedure as defined in clause 4.16.6 to request the release of the PDU Session.

1b. (PDU Session Release initiated by the SMF) The SMF may decide to release a PDU Session under the following scenarios:

Based on a request from the DN (cancelling the UE authorization to access to the DN);

Based on a request from the UDM (subscription change) or from the CHF;

If the SMF received an event notification from the AMF that the UE is out of LADN service area Based on locally configured policy (e.g. the release procedure may be related with the UPF re-allocation for SSC mode 2/mode 3); or If the SMF is notified by the (R)AN that the PDU Session resource establishment has failed during mobility procedure.

The SMF starts PDU Session Release procedure.

2. If there are multiple UPFs associated with the PDU Session (e.g. due to the insertion of UL CL or Branching Point, or redundant I-UPFs if the redundant I-UPFs are used for URLLC), the following procedure is triggered.

2a. The SMF sends an N4 Session Modification Request message to the UPF(s) (including PSAs) of the PDU Session. The UPF(s) shall drop any remaining downlink packets of the PDU Session.

2b. The UPF(s) acknowledges the N4 Session Modification Request by the transmission of an N4 Session Modification Response message to the SMF.

2c. This includes the same procedure in step 2a.

2d. This includes the same procedure in step 2b.

NOTE 1: If the UPFs (N3 termination) and the PSA2 are co-located in a single UPF then steps 2c-2d are skipped.

3a-3b. These steps are the same as steps 4a-4b in clause 4.3.4.2.1

NOTE 2: If the UPFs (N3 termination) and the PSA2 are co-located in a single UPF, the SMF also releases the IP address/Prefix(es) that were allocated to the PDU Session.

4a-4d. These steps are the same as steps 3a-3d in clause 4.3.4.2.1

5 If the SMF has been notified by the AMF that UE is unreachable, e.g. due to the UE is in MICO mode or periodical registration failure, the procedure continues in step 13 by SMF notifying the AMF that the PDU Session is released by invoking the Nsmf_PDUSession_SMContextStatusNotify. The steps 6-12 are skipped.

The SMF creates an N1 SM including PDU Session Release Command message (PDU Session ID, Cause). The Cause may indicate a trigger to establish a new PDU Session with the same characteristics (e.g. when procedures related with SSC mode 2 are invoked).

If the User Plane connection of the PDU Session is activated, the message sent by the SMF to the AMF shall include N2 SM Resource Release request (PDU Session ID) in the Namf_Communication_N1N2MessageTransfer, to release the (R)AN resources associated with the PDU Session. If the User Plane connection of the PDU Session is not activated, the message sent by the SMF to the AMF shall not include N2 SM Resource Release request.

NOTE 3: SSC modes are defined in TS 23.501 [2] clause 5.6.9.

The SMF invokes the Namf_Communication_N1N2MessageTransfer service operation (N1 SM container (PDU Session Release Command), skip indicator).

The "skip indicator" tells the AMF whether it may skip sending the N1 SM container to the UE (e.g. when the UE is in CM-IDLE state). SMF includes the "skip indicator" in the Namf_Communication_N1N2MessageTransfer except when the procedure is triggered to change PDU Session Anchor of a PDU Session with SSC mode 2.

If the UE is in CM-IDLE state and "skip indicator" is included in the Namf_Communication_N1N2MessageTransfer service operation, the AMF acknowledges this step by sending an Namf_Communication_N1N2MessageTransfer Response message ("N1 SM Message Not Transferred") to SMF and steps 6 to 12 are skipped.

6-12. These steps are the same as steps 6-12 in clause 4.3.4.2.1

13. The SMF waits until it has received replies to the N1 and N2 information provided in step 5, as needed.

The SMF invokes Nsmf_PDUSession_SMContextStatusNotify to notify AMF that the SM context for this PDU Session is released. If the UPF included Small Data Rate Control Status and/or APN Rate Control Status in step 4 then the SMF includes Small Data Rate Control Status and/or APN Rate Control Status in its request to the AMF in this step. The AMF releases the association between the SMF ID and the PDU Session ID, DNN, as well as S-NSSAI and stores the Small Data Rate Control Status and/or the APN Rate Control Status in the UE context in AMF. The SMF shall remove any event subscriptions on the AMF that becomes no more needed due to the PDU Session Release.

NOTE 4: The UE and the 5GC will get synchronized about the status of the (released) PDU Session at the next Service Request or Registration procedure.

14. (PDU Session Release initiated by the SMF) If Dynamic PCC applied to this session the SMF invokes an SM Policy Association Termination procedure as defined in clause 4.16.6 to delete the PDU Session.

15-17. These steps are the same as steps 15-17 in clause 4.3.4.2.1

Figure 12:
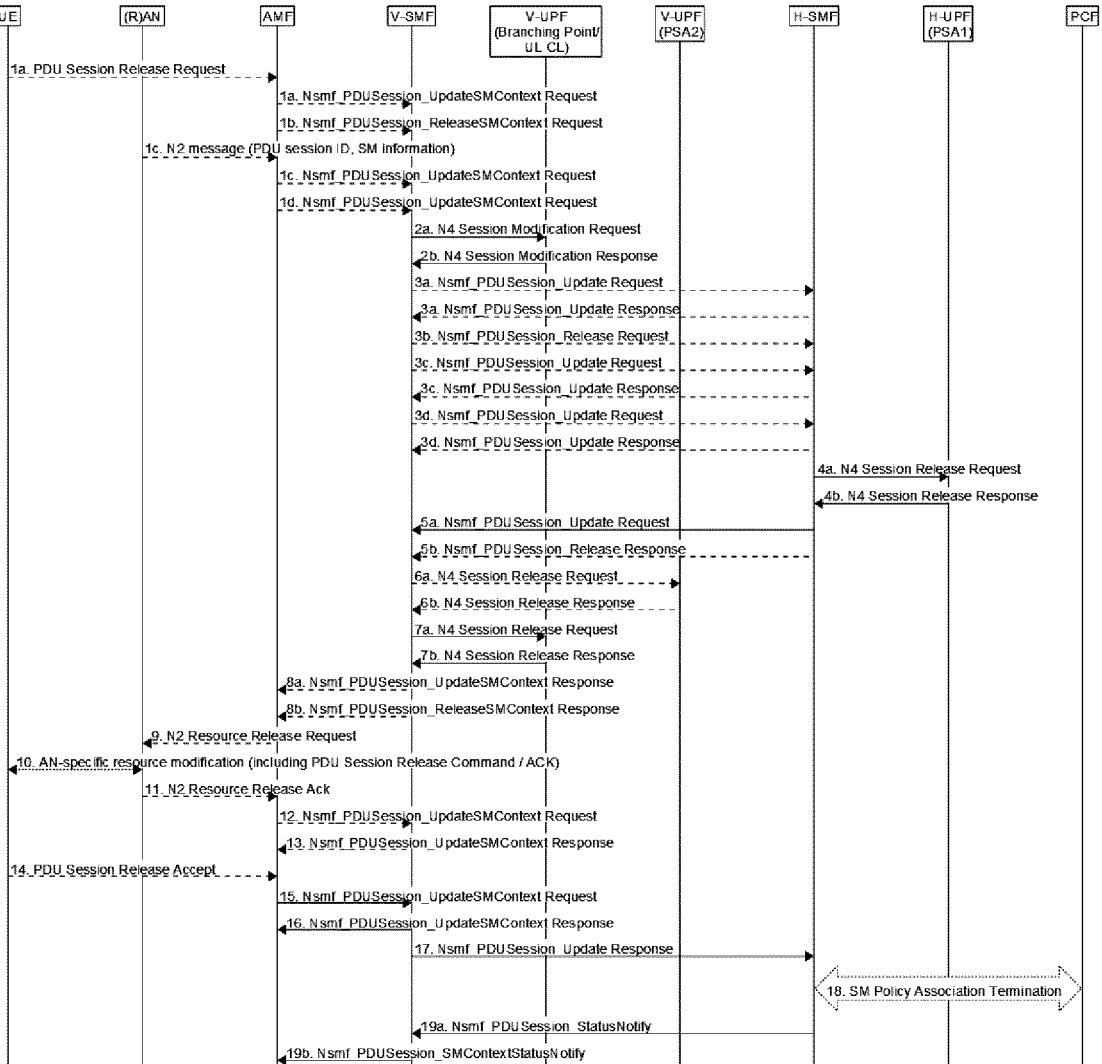
FIG. 12 is a flowchart illustrating an exemplary process in 5GC according to an embodiment of the disclosure.

The following third change is proposed to be made to 3GPP TS 23.502 V16.0.0, where FIG. 12 is FIG. 4.3.4.3.1-1 after the third change and the following text is the text after the third change.

4.3.4.3 UE or Network Requested PDU Session Release for Home-Routed Roaming

This procedure is used in the case of home-routed roaming scenarios.

4.3.4.3.1 UE, Serving Network or (R)AN Requested PDU Session Release for Home-Routed Roaming This clause defines PDU Session Release for Home-routed Roaming during the following procedures:

UE initiated release.

Serving network initiated release.

(R)AN initiated release.

FIG. 4.3.4.3.1-1: UE, Serving network or (R)AN requested PDU Session Release for Home-Routed Roaming 1. The procedure is triggered by one of the following events:

1a. (UE initiated release) As in step 1a of clause 4.3.4.2.1 with the addition that the V-SMF invokes the Nsmf_PDUSession_Update Request (SM Context ID, information from the SM message from the UE e.g. PCO, "Trigger PDU Session Release" indication, Timezone, User Location Information) service operation to request the H-SMF to release the PDU Session. The H-SMF responds to the request immediately in step 3a.

1b. (Serving network initiated release) The serving network initiates the PDU Session Release during UE or serving network initiated Deregistration procedure as specified in clause 4.2.2.3. There is no NAS SM message between the UE and the V-SMF in this case. The V-SMF initiates the release of the PDU Session at the H-SMF by invoking the Nsmf_PDUSession_Release request in step 3b.

The serving network also initiates the PDU Session Release where neither N1 nor N2 SM signalling is needed before releasing the SM context as in step 1b in clause 4.3.4.2.1 if e.g. due to the set of network slices for a UE changes where a network slice instance is no longer available (e.g. as described in TS 23.501 [2] clause 5.15.5.2.2, or the AAA Server triggered Network Slice-Specific Re-authentication and Re-authorization procedure fails as specified in clause 4.2.9.2 or the AAA Server triggered Slice-Specific Authorization Revocation takes place as specified in clause 4.2.9.4).

1c. This step is the same as step 1c in clause 4.3.4.2.1.

1d. This step is the same as step Id in clause 4.3.4.2.1. PDU Session release is specified in steps 5a-19.

2a-2b. These steps are the same as steps 2a-2b in clause 4.3.4.2.1. The SMF is the SMF in VPLMN.

3. The procedure is triggered by one of the following events:

3a. This step is the follow up step of 1a.

3b. This step is the follow up step of 1b.

3c. This step is the follow up step of 1c.

3d. This step is the follow up step of Id.

If the SMF receives the trigger in step 3a, the H-SMF starts PDU Session Release procedure.

4a-4b. These steps are the same as steps 3a-3b in clause 4.3.4.2.1. The SMF is the SMF in HPLMN.

5a. (UE initiated release) The H-SMF prepares the SM Release PDU Session Command message and initiates the PDU Session Release towards the UE by invoking the Nsmf_PDUSession_Update Request service operation towards the V-SMF. The Nsmf_PDUSession_Update Request contains necessary information to build the SM Release PDU Session Command by the V-SMF towards the UE (for example a Release Cause or PCO).

5b. (Serving network initiated release) The H-SMF responds to the PDU release request from the V-SMF with a Nsmf_PDUSession_Release response.

If the UPF included Small Data Rate Control Status in step 4 then the SMF includes Small Data Rate Control Status in the request to the AMF.

If the Control Plane CIoT 5GS Optimisation is enabled for this PDU Session, the steps 6 and 7 are skipped.

6a-6b. The V-SMF releases the corresponding User Plane resources (including PSAs).

These steps are the same as steps 3c-3d in clause 4.3.4.2.1 but controlled from the SMF in VPLMN.

NOTE 1: If the UPFs (N3 termination) and the PSA2 are co-located in a single UPF then steps 6a -6b are skipped.

7a-7b. The V-SMF releases the corresponding User Plane resources (including N3 termination). These steps are the same as steps 4a-3b in clause 4.3.4.2.1 but controlled from the SMF in VPLMN.

NOTE2: If the UPFs (N3 termination) and the PSA2 are co-located in a single UPF, the SMF also releases the IP address/Prefix(es) that were allocated to the PDU Session.

8-16. These steps are the same as steps 5-12 in clause 4.3.4.2.1.

17. (UE initiated release) The V-SMF responds to the Nsmf_PDUSession_Update Request invoked at step 5a and confirms the PDU Session Release. The Nsmf_PDUSession_Update response may carry information such as PCO received from the UE in SM PDU Session Release Accept. as well as User Location Information, Time Zone and Secondary RAT Usage Data.

18. (UE or Serving network initiated release) The H-SMF releases the SM policy control association with the PCF by invoking the SM Policy Association Termination procedure defined in clause 4.16.6. For serving network initiated PDU Session Release case, this step happens between step 3b and step 5b.

19. (UE initiated release) The H-SMF shall remove all contexts associated with the PDU Session:

19a. The H-SMF requests the V-SMF to release all contexts associated with the PDU Session by invoking the Nsmf_PDUSession_StatusNotify (Release) operation.

19b. The V-SMF requests the AMF to release all contexts associated with the PDU Session by invoking the Nsmf_PDUSession_SMContextStatusNotify (Release). The AMF releases the association between the SMF ID and the PDU Session ID.

Figure 13:
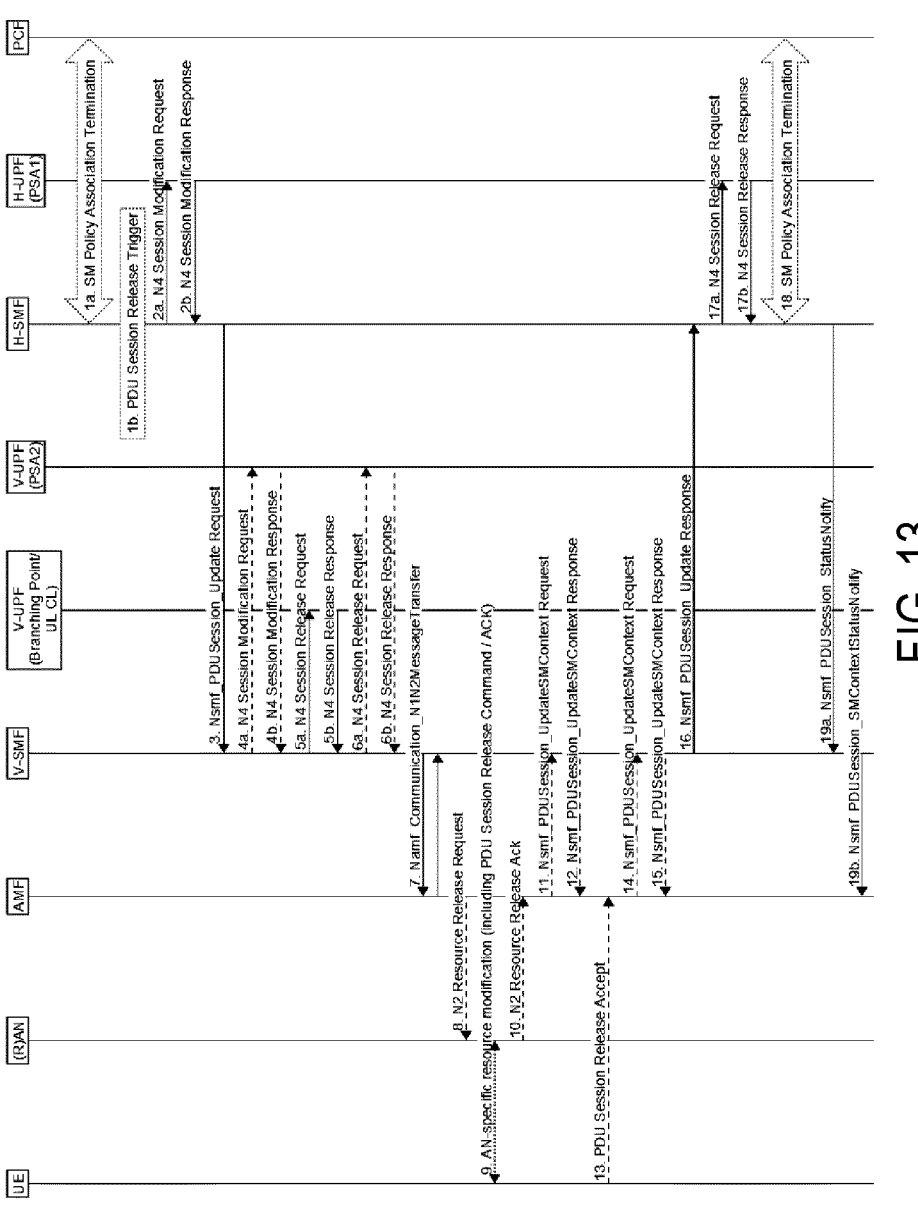
FIG. 13 is a flowchart illustrating an exemplary process in 5GC according to an embodiment of the disclosure.

The following fourth change is proposed to be made to 3GPP TS 23.502 V16.0.0, where FIG. 13 is FIG. 4.3.4.3.2-1 after the fourth change and the following text is the text after the fourth change.

4.3.4.3.2 HPLMN Requested PDU Session Release for Home-Routed Roaming

This clause defines PDU Session Release for Home-routed Roaming during the following procedures:

PCF initiated release.

H-SMF initiated release.

FIG. 4.3.4.3.2-1: HPLMN requested PDU Session Release for Home-Routed Roaming

1. The procedure is triggered by one of the following events:

1a. This step is the same as step 1a in clause 4.3.4.2.2.

1b. This step is the same as step 1b in clause 4.3.4.2.2. The H-SMF starts PDU Session Release procedure.

2a-2b. These steps are the same as steps 2a-2b in clause 4.3.4.2.2. The SMF is the SMF in HPLMN.

3. The H-SMF prepares the SM Release PDU Session Command message and initiates the PDU Session Release towards the UE by invoking the Nsmf_PDUSession_Update Request service operation towards the V-SMF. The Nsmf_PDUSession_Update Request contains necessary information to build the SM Release PDU Session Command by the V-SMF towards the UE (for example a Release Cause or PCO).

4a-4b. These steps are the same as steps 2c-2d in clause 4.3.4.2.2. The SMF is the SMF in VPLMN.

NOTE 1: If the UPFs (N3 termination) and the PSA2 are co-located in a single UPF then steps 4a -4b are skipped.

5a-5b. The V-SMF releases the corresponding User Plane resources (including N3 termination). These steps are the same as steps 3a-3b in clause 4.3.4.2.2. The SMF is the SMF in VPLMN.

NOTE 2: If the UPFs (N3 termination) and the PSA2 are co-located in a single UPF, the SMF also releases the IP address/Prefix(es) that were allocated to the PDU Session.

6a-6b. The V-SMF releases the corresponding User Plane resources (including PSAs).

These steps are the same as steps 4c-4d in clause 4.3.4.2.2.

NOTE 3: If the UPFs (N3 termination) and the PSA2 are co-located in a single UPF then steps 6a -4b are skipped.

7-15. These steps are the same as steps 5-12 in clause 4.3.4.2.2.

16. The V-SMF responds to the Nsmf_PDUSession_Update Request invoked at step 3 and confirms the PDU Session Release. The Nsmf_PDUSession_Update response may carry information such as PCO received from the UE in SM PDU Session Release Accept. as well as User Location Information, Time Zone and Secondary RAT Usage Data.

17a-17b. The H-SMF releases the corresponding User Plane resources (including PSAs). These steps are the same as steps 4a-4b in clause 4.3.4.2.2, but controlled from the SMF in HPLMN.

18. (H-SMF initiated release) The H-SMF releases the SM policy control association with the PCF by invoking the SM Policy Association Termination procedure defined in clause 4.16.6.

19. The H-SMF shall remove all contexts associated with the PDU Session:

19a. The H-SMF requests the V-SMF to release all contexts associated with the PDU Session by invoking the Nsmf_PDUSession_StatusNotify (Release) operation.

19b. The V-SMF requests the AMF to release all contexts associated with the PDU Session by invoking the Nsmf_PDUSession_SMContextStatusNotify (Release). The AMF releases the association between the SMF ID and the PDU Session ID.

Figure 14:
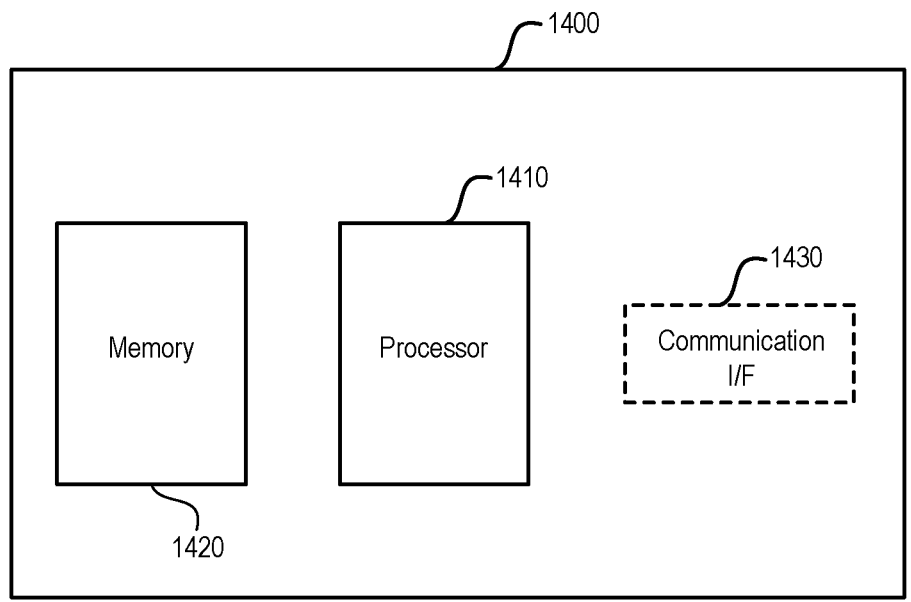
FIG. 14 is a block diagram showing an apparatus suitable for use in practicing some embodiments of the disclosure.

FIG. 14 is a block diagram showing an apparatus suitable for use in practicing some embodiments of the disclosure. For example, any one of the user plane entity and the SMF described above may be implemented through the apparatus 1400. As shown, the apparatus 1400 may include a processor 1410, a memory 1420 that stores a program, and optionally a communication interface 1430 for communicating data with other external devices through wired and/or wireless communication.

The program includes program instructions that, when executed by the processor 1410, enable the apparatus 1400 to operate in accordance with the embodiments of the present disclosure, as discussed above. That is, the embodiments of the present disclosure may be implemented at least in part by computer software executable by the processor 1410, or by hardware, or by a combination of software and hardware.

The memory 1420 may be of any type suitable to the local technical environment and may be implemented using any suitable data storage technology, such as semiconductor based memory devices, flash memories, magnetic memory devices and systems, optical memory devices and systems, fixed memories and removable memories. The processor 1410 may be of any type suitable to the local technical environment, and may include one or more of general purpose computers, special purpose computers, microprocessors, digital signal processors (DSPs) and processors based on multi-core processor architectures, as non-limiting examples.

Figure 15:
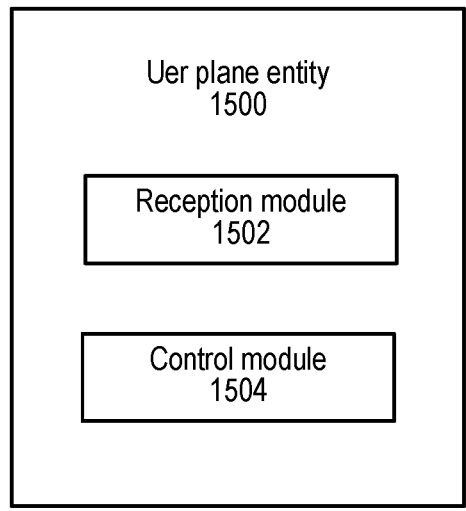
FIG. 15 is a block diagram showing an apparatus implementing a user plane entity according to an embodiment of the disclosure.

FIG. 15 is a block diagram showing an apparatus implementing a user plane entity according to an embodiment of the disclosure. As shown, the apparatus 1500 comprises a reception module 1502 and a control module 1504. The reception module 1502 may be configured to receive, from a control plane entity, a request for modifying parameters related to a packet data connection at least part of which is to be deleted, as described above with respect to block 402. The control module may be configured to, upon receipt of the request, stop forwarding and counting of packets in only one of downlink and uplink directions for the at least part of the packet data connection to be deleted, as described above with respect to block 404.

Figure 16:
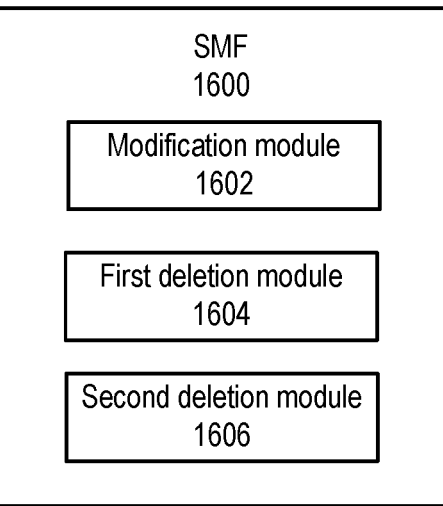
FIG. 16 is a block diagram showing an apparatus implementing an SMF according to an embodiment of the disclosure.

FIG. 16 is a block diagram showing an apparatus implementing an SMF according to an embodiment of the disclosure. As shown, the apparatus 1600 comprises a modification module 1602, a first deletion module 1604 and a second deletion module 1604. The modification module 1602 may be configured to, in response to a UE or serving network or access network requested PDU session release procedure, send, to one or more first UPFs acting as N3 termination, one or more first requests for modifying parameters related to the PDU session to be deleted, as described above with respect to block 502 The first deletion module 1604 may be configured to send, to one or more second UPFs acting as PSAs, one or more second requests for deleting the PDU session, as described above with respect to block 504. The second deletion module 1606 may be configured to, upon the one or more second UPFs have deleted the PDU session, send, to the one or more first UPFs, one or more third requests for deleting the PDU session, as described above with respect to block 506.

Figure 17:
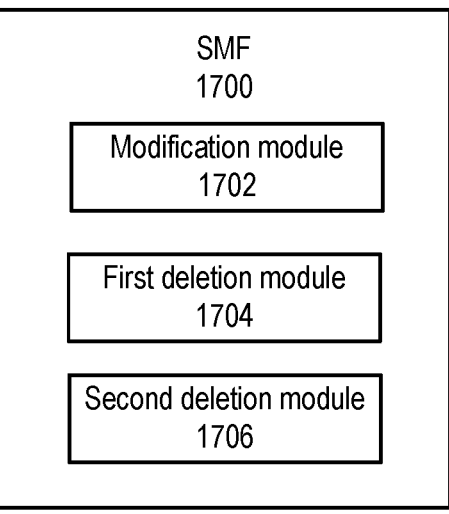
FIG. 17 is a block diagram showing an apparatus implementing an SMF according to an embodiment of the disclosure.

FIG. 17 is a block diagram showing an apparatus implementing an SMF according to an embodiment of the disclosure. As shown, the apparatus 1700 comprises a modification module 1702, a first deletion module 1704 and a second deletion module 1704. The modification module 1702 may be configured to, in response to a PCF or the SMF requested PDU session release procedure, send, to one or more first UPFs acting as PSAs, one or more first requests for modifying parameters related to the PDU session to be deleted, as described above with respect to block 508. The first deletion module 1704 may be configured to send, to one or more second UPFs acting as N3 termination, one or more second requests for deleting the PDU session, as described above with respect to block 510. The second deletion module may be configured to, upon the one or more second UPFs have deleted the PDU session, send, to the one or more first UPFs, one or more third requests for deleting the PDU session, as described above with respect to block 512. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another.

For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a user plane function (UPF), the method comprising:

receiving, from a session management function (SMF), a first request concerning a protocol data unit (PDU) session;

after receiving the first request, stopping forwarding traffic for the PDU session in only an uplink direction and stopping taking the uplink traffic into account for usage monitoring;

after receiving the first request, receiving, from the SMF, a second request to drop any remaining packets for the PDU session; and after receiving the second request, dropping remaining packets for the PDU session, if any, wherein the SMF is a visited SMF (V-SMF), and the UPF is a visited UPF (V-UPF).

2. The method of claim 1, wherein the first request is an N4 Session Modification Request.

3. The method of claim 2, wherein the second request is an N4 Session Release Request.

4. A method performed by a session management function (SMF), the method comprising:

in response to a requested protocol data unit (PDU) session release procedure, sending to a user plane function (UPF) a first request to stop forwarding traffic for a protocol data unit (PDU) session in an uplink direction;

receiving from the UPF a first response responsive to the first request; and after receiving the first response, sending to the UPF a second request to drop any remaining packets for the PDU session, wherein the SMF is a visited SMF (V-SMF), the UPF is a visited UPF (V-UPF), and the V-UPF stops forwarding traffic for the PDU session in only the uplink direction and stops taking the uplink traffic into account for the usage monitoring.

5. The method of claim 4, wherein the first request is an N4 Session Modification Request.

6. The method of claim 5, wherein the second request is an N4 Session Release Request.

* * * * *